US012727061B2

(12) United States Patent
Deshpande et al.

(10) Patent No.: US 12,727,061 B2
(45) Date of Patent: Sep. 1, 2026

(54) COOKING OVEN WITH A DOOR HAVING REDUCED TEMPERATURE DURING USE

(71) Applicant: WHIRLPOOL CORPORATION, Benton Harbor, MI (US)

(72) Inventors: Alok Chandrakant Deshpande, Lombardia (IT); Ankur Garg, Pune (IN); Ajit Maruti Patil, Tasgaon Sangli (IN); Claudio Maria Marongiu, Varese (IT); Wojciech Adam Pawlowski, Wrocław (PL)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 602 days.

(21) Appl. No.: 18/317,502

(22) Filed: May 15, 2023

(65) Prior Publication Data

US 2024/0389206 A1 Nov. 21, 2024

(51) Int. Cl.
*H05B 6/64* (2006.01)
*F24C 15/02* (2006.01)

(52) U.S. Cl.
CPC ......... *H05B 6/6414* (2013.01); *F24C 15/022* (2013.01); *H05B 6/647* (2013.01)

(58) Field of Classification Search
CPC ........ H05B 6/6414; H05B 6/647; H05B 6/76; H05B 6/763; F24C 15/022; F24C 15/023
See application file for complete search history.

(56) References Cited

U.S. PATENT DOCUMENTS 4,335,292 A * 6/1982 Tanaka ................. H05B 6/6411 D7/351
8,847,133 B2 9/2014 Lee
11,116,049 B2 * 9/2021 Shin ........................ E05C 19/12
2010/0181308 A1 7/2010 Lee
2019/0316778 A1 * 10/2019 Lee ....................... F24C 15/023
2022/0159796 A1 5/2022 Feng et al.
2022/0221162 A1 7/2022 Feng et al.
(Continued)

FOREIGN PATENT DOCUMENTS

CN 203615385 U 5/2014
CN 214370418 U 10/2021
CN 215675333 U 1/2022
(Continued)

OTHER PUBLICATIONS

Machine Translation of DE102016124070A1; Retrieved from ESPACENET on Jan. 8, 2026.*

*Primary Examiner* — Sang K Kim
(74) *Attorney, Agent, or Firm* — PRICE HENEVELD LLP

(57) ABSTRACT

A cooking oven includes: (a) a cooking cavity; (b) a door to provide selective access to the cooking cavity; (c) a forward panel facing the door when the door takes a closed position, the forward panel comprising a latch cutout; (d) a latch assembly with a base portion that extends from rearward of the forward panel, through the latch cutout with a gap between the latch cutout and the base portion, and forward of the forward panel to couple to the door; and (e) a seal, such as that provided by a latch cover, that at least partially seals the gap to reduce air flow through the gap. During use of the cooking oven, a forward surface of the door forward of the gap exhibits a reduced temperature compared to if no such seal, such as that provided by the latch cover, was included.

17 Claims, 18 Drawing Sheets

(56) References Cited

U.S. PATENT DOCUMENTS

2025/0351240 A1* 11/2025 Goto .................... H05B 6/6402

FOREIGN PATENT DOCUMENTS

| | | | | |
|---|---|---|---|---|
| DE | 102016124070 | A1 * | 6/2018 | ............ F24C 15/023 |
| KR | 20090123429 | A | 12/2009 | |
| KR | 101798579 | B1 | 11/2017 | |
| KR | 20190097607 | A | 8/2019 | |

* cited by examiner

Example 1

Comparative Example 1

COOKING OVEN WITH A DOOR HAVING REDUCED TEMPERATURE DURING USE

BACKGROUND OF THE DISCLOSURE

The present disclosure generally relates to a cooking oven, and more specifically, to a cooking oven with microwave oven functionality with features to reduce the temperature of a door of the cooking oven during use.

Some cooking ovens offer microwave cooking functionality. Microwave cooking functionality typically incorporates a magnetron anode, through which a high-frequency electrical current passes during generation of the microwave energy that ultimately cooks a food item within the cooking oven. The electrical current passing through the magnetron anode raises the temperature thereof. Such cooking ovens typically include a cooling system to lower the temperature of the magnetron anode. Sometimes, the cooling system includes a fan to cause air to flow around the magnetron anode, extract heat therefrom, and to cause the air (now heated) to flow via an air flow path partially bound by a forward panel of the cooking oven to dedicated exits at the bottom of the microwave oven. The heat flows through the dedicated exits and into the external environment. In some instances, the microwave oven further includes a door with a latch and a latching mechanism for the latch of the door within the air flow path. When the door is in a closed position, the latch of the door projects through a latch cutout through the forward panel to reach the latching mechanism.

However, there is a problem in that some of the air flow deviates from the desired air flow path, proceeds through a gap between the latch cutout and the latch, and contacts the door. The air flow that exits the microwave oven in this manner raises the temperature of a forward surface of the door near the latch a suboptimal amount.

SUMMARY OF THE DISCLOSURE

The present disclosure addresses that problem with a seal that at least partially seals the gap to reduce air flow through the gap. A latch cover over the latch can interface with the forward panel to operate as the seal. Alternatively, an air flow conduit can be utilized to bypass the area near the gap.

According to one aspect of the present disclosure, a cooking oven comprises: (a) an inner liner assembly defining a cooking cavity configured to accept a food item for a cooking operation; (b) an outer wrapper assembly at least partially enveloping the inner liner assembly, the outer wrapper assembly comprising a bottom panel that is disposed beneath the cooking cavity; (c) a forward panel interfacing with the inner liner assembly and the outer wrapper assembly, the forward panel comprising (i) a cavity aperture defining an opening into the cooking cavity and (ii) a latch cutout disposed elevationally above the bottom panel of the outer wrapper assembly; (d) a magnetron disposed between the inner liner assembly and the outer wrapper assembly, and rearward of the forward panel, the magnetron configured to generate electromagnetic waves; (e) a door disposed forward of the inner liner assembly, the outer wrapper assembly, and the forward panel, the door movable to, from, and between (i) a closed position that at least partially covers the opening into the cooking cavity and denies access thereto from an external environment and (ii) an open position that covers the opening into the cooking cavity less than when in the closed position and allows access thereto from the external environment; (f) a latch assembly comprising (i) a base portion that is both disposed outside of the inner liner assembly and disposed on the bottom panel of the outer wrapper assembly and extends through the latch cutout of the forward panel and (ii) a door portion disposed forward of the forward panel that is coupled to both the base portion and the door; and (g) a latch cover that covers the base portion of the latch assembly disposed rearward of the forward panel and at least partially covers a gap between the base portion of the latch assembly and the forward panel at the latch cutout of the forward panel.

According to another aspect of the present disclosure, a cooking oven comprises: (a) an inner liner assembly defining a cooking cavity configured to accept a food item for heating, the inner liner assembly comprising (i) a top panel, (ii) a bottom panel opposing the top panel, and (side panels that oppose each other; (b) an outer wrapper assembly at least partially enveloping the inner liner assembly, the outer wrapper assembly comprising (i) a bottom panel that extends beneath and opposes the bottom panel of the inner liner assembly and is separated therefrom by a bottom space, (ii) a top panel disposed above and opposing the top panel of the inner liner assembly, wherein the side panels of the inner liner assembly interface with the bottom panel of the outer wrapper and extend upward therefrom, and (iii) side panels that oppose each other, with the side panels of the inner liner assembly disposed therebetween and each separated from the nearest side panel of the inner wrapper assembly to form a side space; (c) a carriage attached to the outer wrapper assembly and disposed between the top panel of the inner liner assembly and the top panel of the outer wrapper assembly, the carriage (i) separated from the top panel of the outer wrapper assembly by a top space and (ii) comprising an air flow aperture in communication with the top space; (d) a forward panel interfacing with the inner liner and the outer wrapper assembly, the forward panel comprising (i) a cavity aperture defining an opening into the cooking cavity and (ii) a latch cutout disposed elevationally above the bottom panel of the outer wrapper assembly; (e) a magnetron disposed between the carriage and the outer wrapper assembly, and rearward of the forward panel, the magnetron configured to generate electromagnetic waves; (f) a door disposed forward of the inner liner assembly, the outer wrapper assembly, and the forward panel, the door movable to, from, and between (i) a closed position that at least partially covers the opening into the cooking cavity and denies access thereto from an external environment and (ii) an open position that covers the opening into the cooking cavity less than when in the closed position and allows access thereto from the external environment; (g) a latch assembly comprising (a) a base portion that is (i) disposed between one of the side panels of the inner liner assembly and one of the side panels of the outer wrapper assembly and (ii) coupled to the bottom panel of the outer wrapper assembly and extends through the latch cutout of the forward panel, and (b) a door portion disposed forward of the forward panel that is coupled to both the base portion and the door, wherein the side panel of the inner liner assembly closest to the base portion of the latch assembly comprises an air flow aperture in communication with the bottom space; and (h) an air flow conduit disposed within the side space, the air flow conduit comprising (i) a top end in communication with the air flow aperture through the carriage and (ii) a bottom end in communication with the air flow aperture through the side panel of the inner liner assembly.

According to yet another aspect of the present disclosure, a cooking oven comprises: (a) a cooking cavity; (b) a door to provide selective access to the cooking cavity; (c) a forward panel facing the door when the door takes a closed position, the forward panel comprising a latch cutout; (d) a latch assembly with a base portion that extends from rearward of the forward panel, through the latch cutout with a gap between the latch cutout and the base portion, and forward of the forward panel to couple to the door; and (e) a seal that at least partially seals the gap to reduce air flow through the gap.

These and other features, advantages, and objects of the present disclosure will be further understood and appreciated by those skilled in the art by reference to the following specification, claims, and appended drawings.

Figure 1:
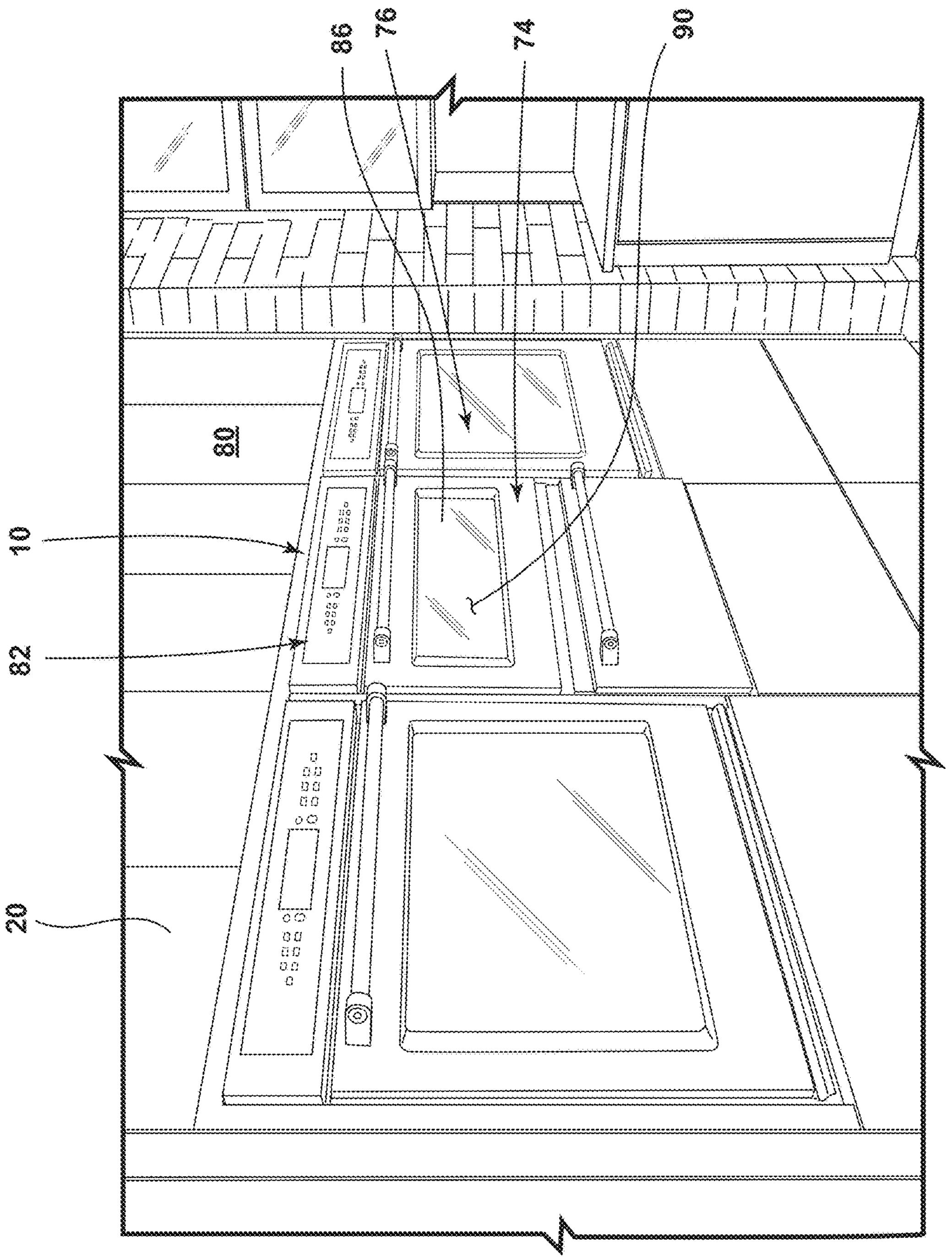
FIG. 1 is a perspective view of a cooking oven of the present disclosure of the built-in variety recessed into cabinetry so that a forward surface of a door and a user interface are exposed to an external environment within a kitchen.

The components in the figures are not necessarily to scale, emphasis instead being placed upon illustrating the principles described herein.

DETAILED DESCRIPTION

The present illustrated embodiments reside primarily in combinations of method steps and apparatus components related to a cooking oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises a . . . ” does not, without more constraints, preclude the existence of additional identical elements in the process, method, article, or apparatus that comprises the element.

Figure 2:
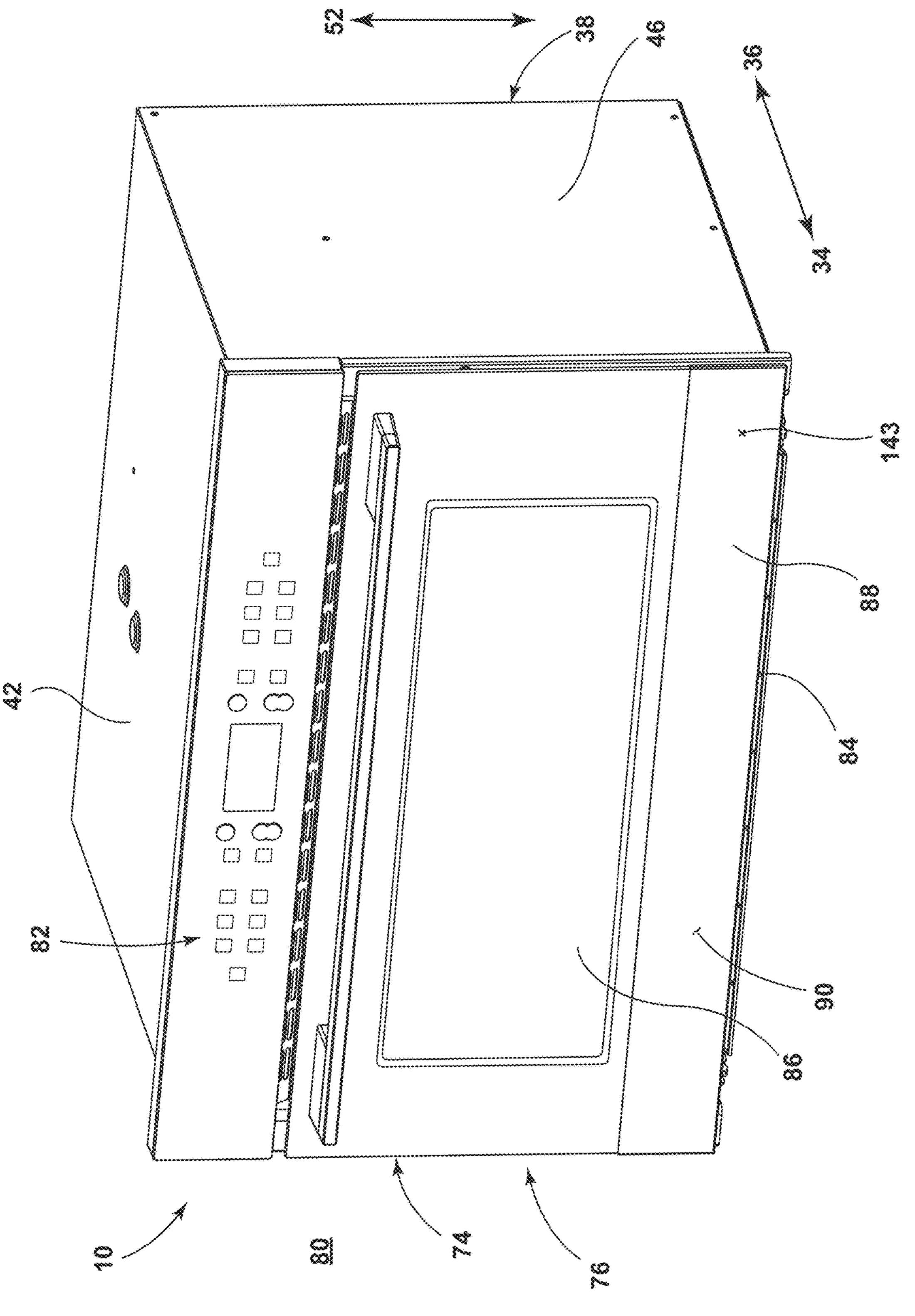
FIG. 2 is a perspective view of the cooking oven of FIG. 1, illustrating an outer wrapper assembly and the door in a closed position.
Figure 3:
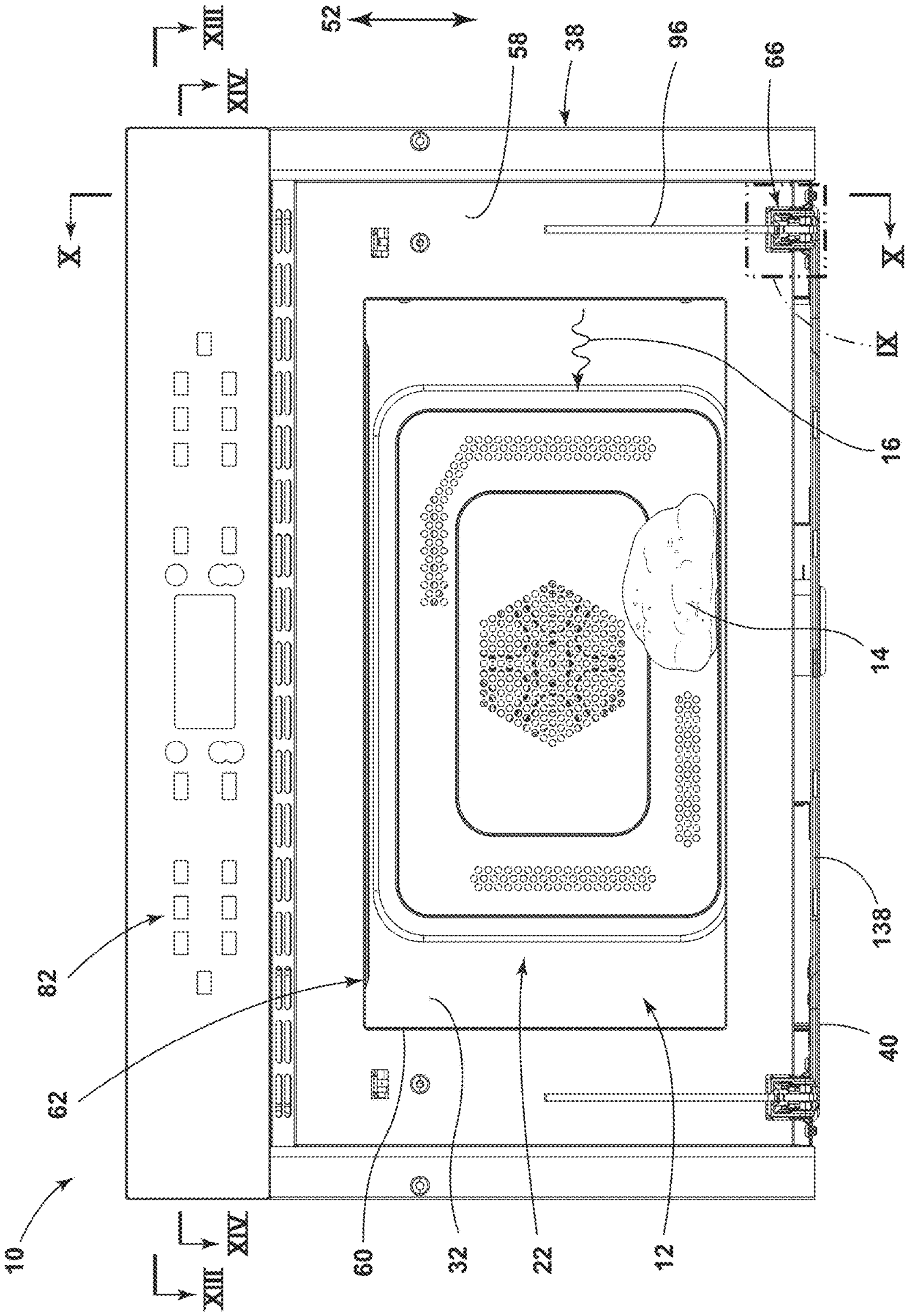
FIG. 3 is a front elevational view of the cooking oven of FIG. 1 with the door removed, illustrating an inner liner assembly defining a cooking cavity into which a food item is disposed for a cooking operation.

Referring to FIGS. 1-3, reference numeral 10 generally designates a cooking oven. The cooking oven 10 includes a cooking cavity 12. The cooking cavity 12 is configured to accept a food item 14 for a cooking operation. In particular, the cooking oven 10 utilizes electromagnetic waves 16 to perform a “microwave” cooking operation. However, the cooking oven 10 can include other devices to increase the temperature within the cooking cavity 12 to perform the cooking operation, such as one or more heating elements 18 to provide grilling, frying, and convection cooking operations. The cooking oven 10 can be a stand-alone countertop unit or can be of the “built-in” variety (as illustrated) that are configured to be recessed into cabinetry 20.

Figure 4:
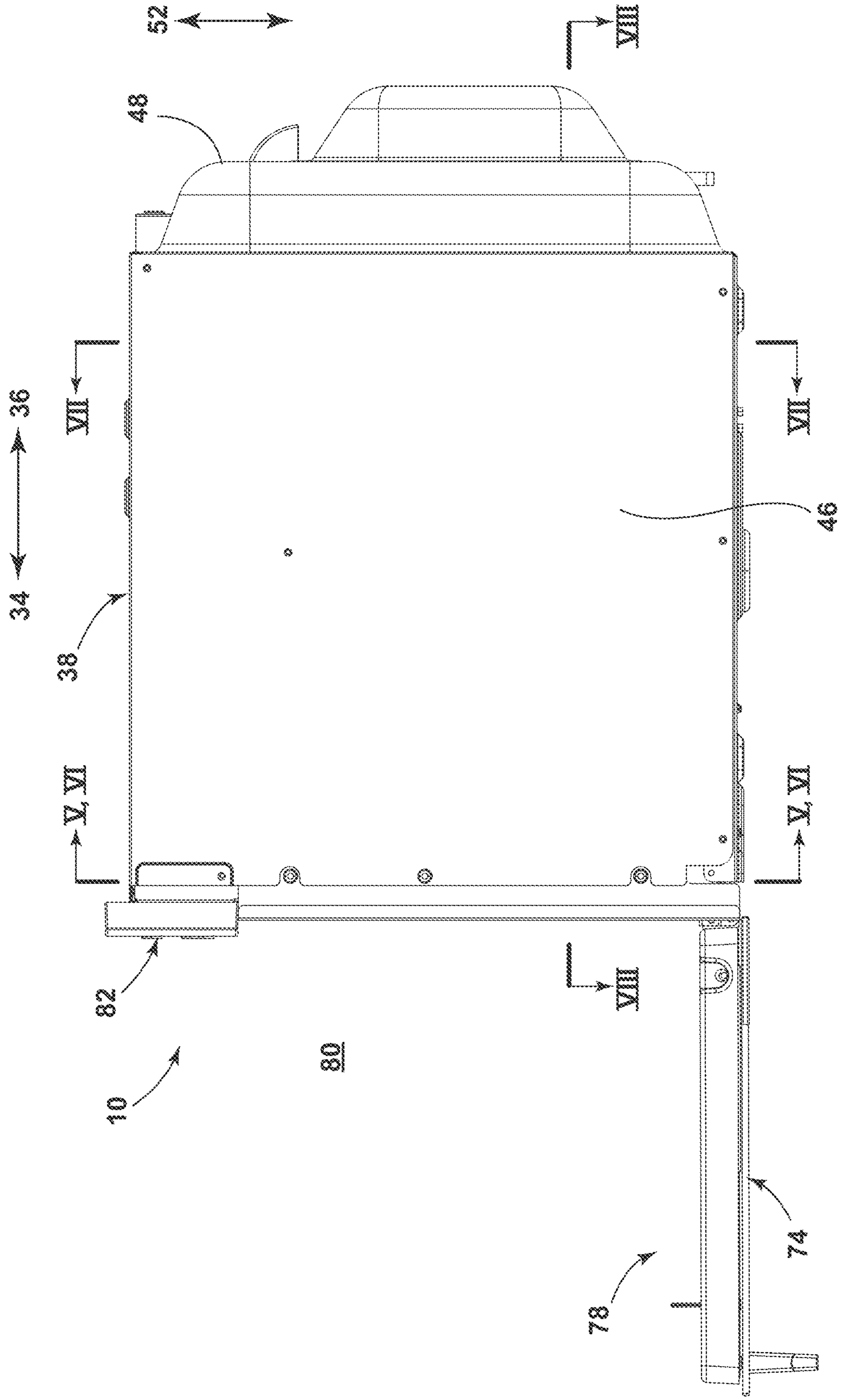
FIG. 4 is a side elevational view of the cooking oven of FIG. 1 with the door in an open position, illustrating the outer wrapper assembly including a side panel and a rear panel.
Figure 5:
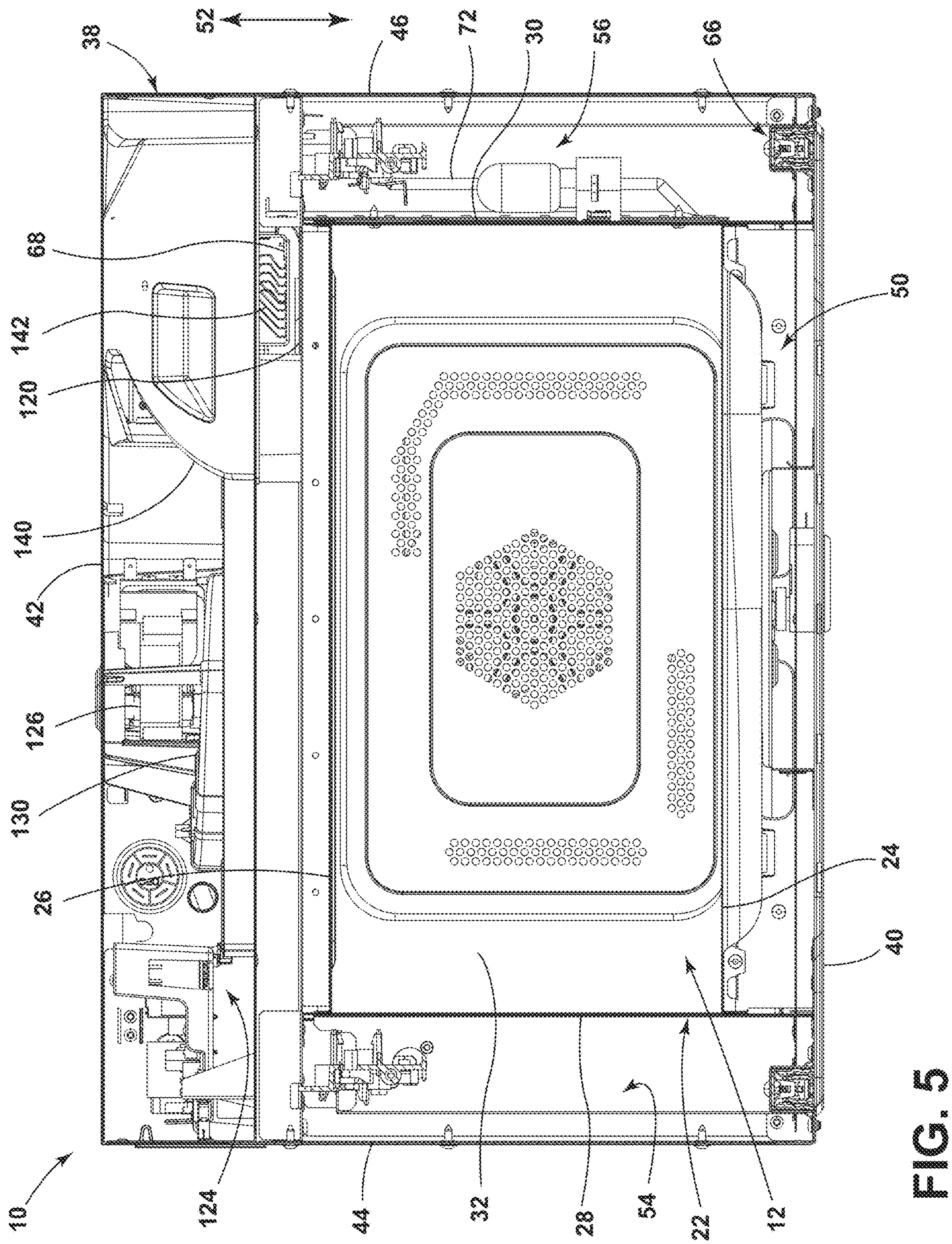
FIG. 5 is a front elevational view of a cross-section of the cooking oven of FIG. 1 taken through line V-V of FIG. 4, illustrating a bottom panel, a top panel, a rear panel, and side panels of the inner liner assembly defining the cooking cavity.

Referring additionally to FIGS. 4 and 5, the cooking oven 10 includes an inner liner assembly 22. The inner liner assembly 22 defines the cooking cavity 12. For example, the inner liner assembly 22 includes a bottom panel 24, a top panel 26, a side panel 28, a side panel 30, and a rear panel 32, each of which partially define the cooking cavity 12. The top panel 26 and the bottom panel 24 are horizontally oriented and oppose each other. The side panels 28, 30 oppose each other. The side panels 28, 30 are vertically oriented and extend forward 34 to rearward 36. The bottom panel 24, the top panel 26, the side panels 28, 30, and the rear panel 32 together define the cooking cavity 12. The inner liner assembly 22 is configured to accept the food item 14, among other reasons, because there is no panel of the inner liner assembly 22 fully opposing the rear panel 32. Thus, the inner liner assembly 22 allows access into the cooking cavity 12. Further, the top panel 26 is sufficiently separated from the bottom panel 24, and the side panels 28, 30 are sufficiently separated from each other, to permit acceptance of the food item 14 for the cooking operation. The bottom panel 24, a top panel 26, the side panels 28, 30, and the rear panel 32 can all be individual pieces of material that are fastened, welded, attached, or otherwise coupled together to provide structural stability.

Figure 6:
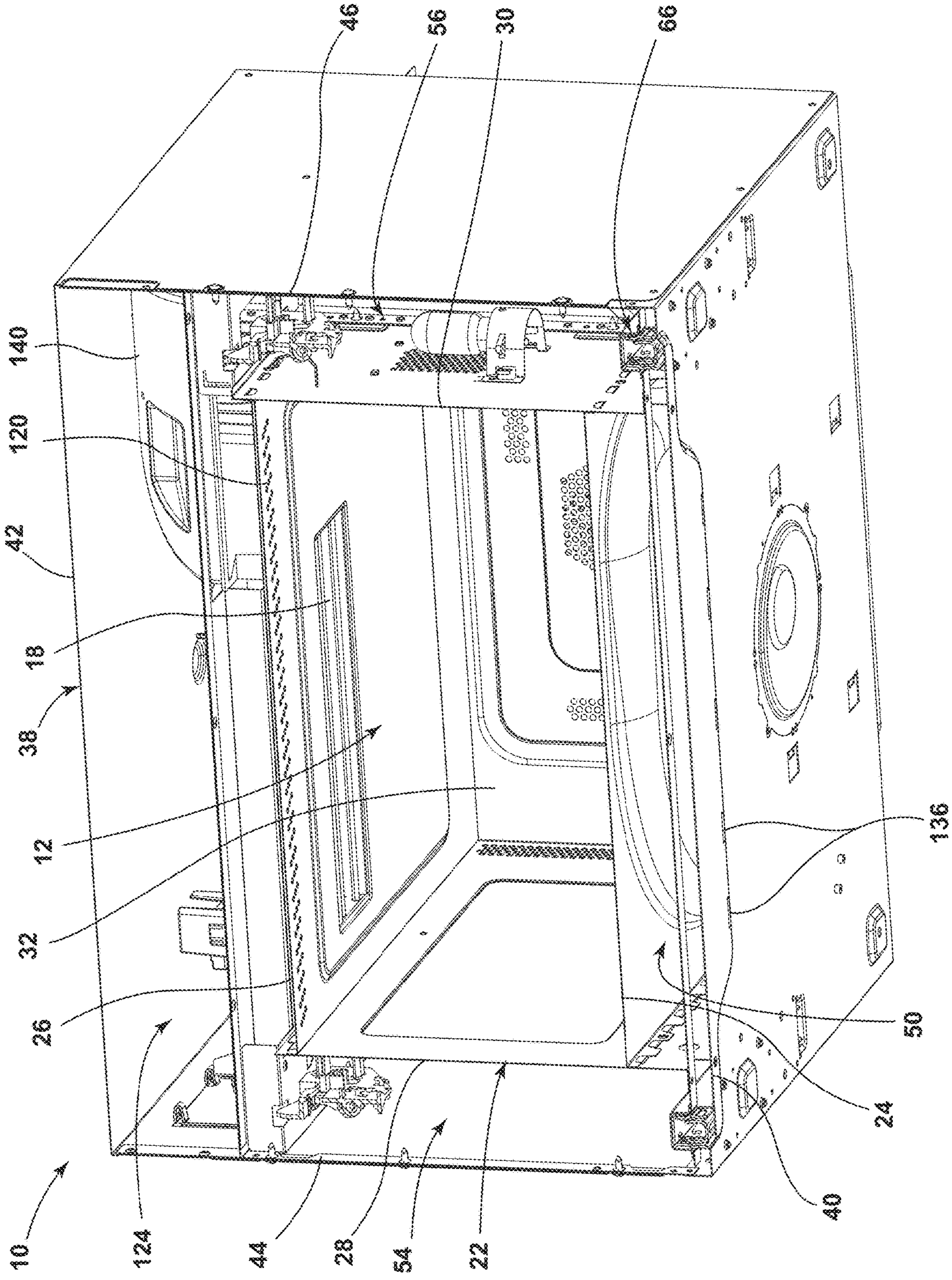
FIG. 6 is a front perspective view of a cross-section of the cooking oven of FIG. 1 taken through line VI-VI of FIG. 4, illustrating the outer wrapper assembly partially enveloping the inner liner assembly with a bottom panel, a top panel, and side panels.

Referring additionally to FIG. 6, the cooking oven 10 further includes an outer wrapper assembly 38. The outer wrapper assembly 38 at least partially envelopes the inner liner assembly 22. In particular, the outer wrapper assembly 38 includes a bottom panel 40, a top panel 42, a side panel 44, a side panel 46, and a rear panel 48. The bottom panel 40 and the top panel 42 oppose each other. The top panel 42 additionally opposes the top panel 26 of the inner liner assembly 22. The side panels 44, 46 oppose each other. There is no panel of the outer wrapper assembly 38 fully opposing the rear panel 48 and the cooking cavity 12 is free to accept the food item 14 for heating. The bottom panel 40 and the top panel 42 are horizontally oriented. The side panels 44, 46 are vertically oriented, as is the rear panel 48, which is generally orthogonally oriented to the side panels 44, 46.

The bottom panel 40 of the outer wrapper assembly 38 is disposed beneath the bottom panel 24 of the inner liner assembly 22 and the cooking cavity 12. The bottom panel 40 opposes the bottom panel 24 of the inner liner assembly 22. The bottom panels 24, 40 are separated from each other thus forming a bottom space 50 therebetween. The side panels 28, 30 of the inner liner assembly 22 interface with (e.g., contact and are fastened to) the bottom panel 40 of the outer wrapper assembly 38 and extend upward 52 therefrom.

The side panels 44, 46 of the outer wrapper assembly 38 oppose each other. The side panels 28, 30 of the inner liner assembly 22 are disposed between the side panels 44, 46 of the outer wrapper assembly 38, as is the cooking cavity 12. The side panels 44, 46 of the outer wrapper assembly 38 are separated from the nearest side panel 28, 30 of the inner liner assembly 22, respectively, to form side spaces 54, 56, respectively. More particularly, the side space 54 separates the side panel 44 of the outer wrapper assembly 38 from the side panel 28 of the inner liner assembly 22. Similarly, the side space 56 separates the side panel 46 of the outer wrapper assembly 38 from the side panel 30 of the inner liner assembly 22.

Figure 7:
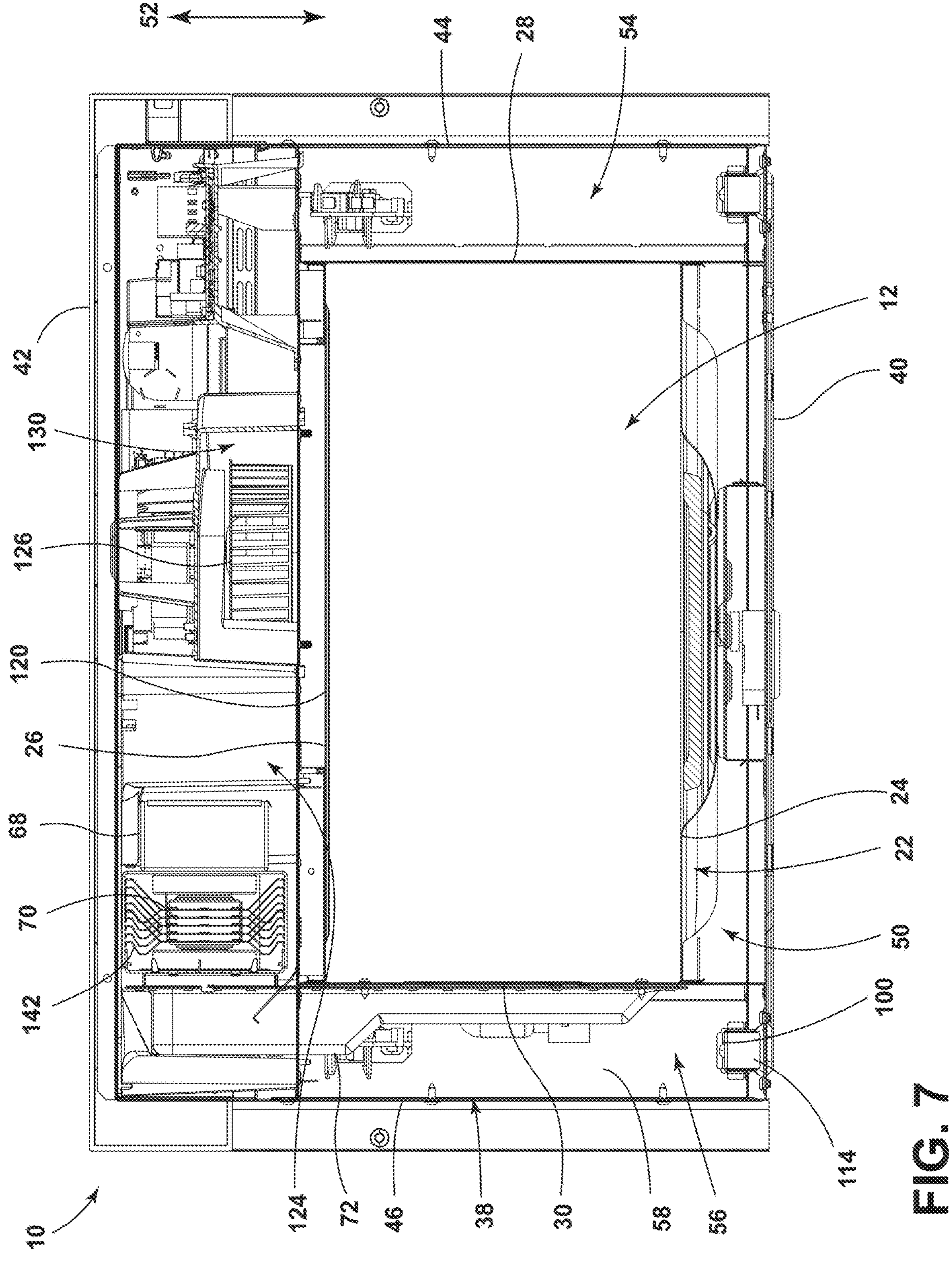
FIG. 7 is a rear elevational view of a cross-section of the cooking oven of FIG. 1 taken through line VII-VII of FIG. 4, illustrating a carriage disposed above the cooking cavity but below the top panel of the outer wrapper assembly to define a top space where a magnetron and a fan are disposed.
Figure 8:
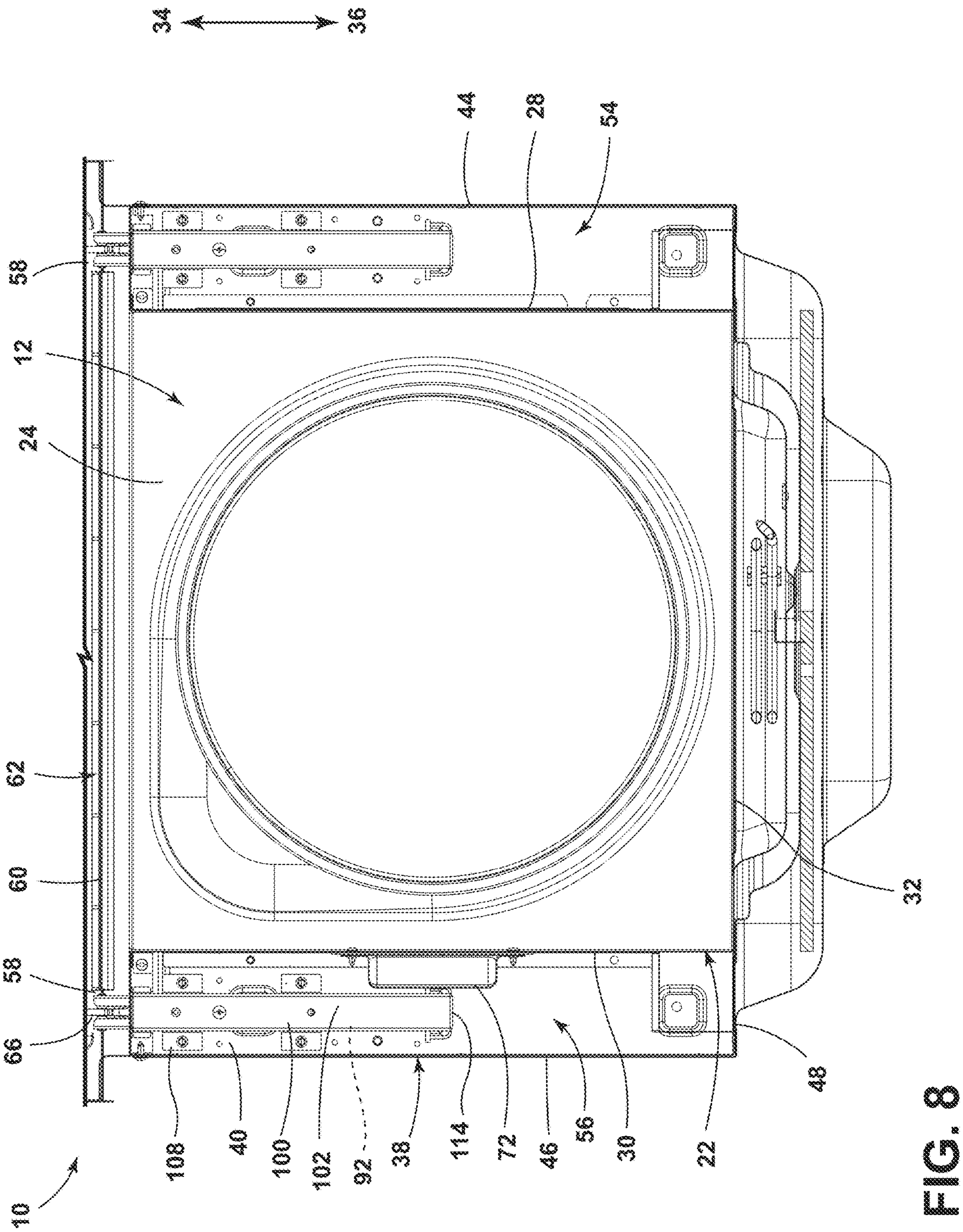
FIG. 8 is an overheat view of a cross-section of the cooking oven of FIG. 1 taken through line VIII-VIII of FIG. 4, illustrating the side panel of the outer wrapper assembly separated by the side panel of the inner liner assembly to define a side space within which a latch cover is disposed to cover a base portion latch assembly.
Figure 9:
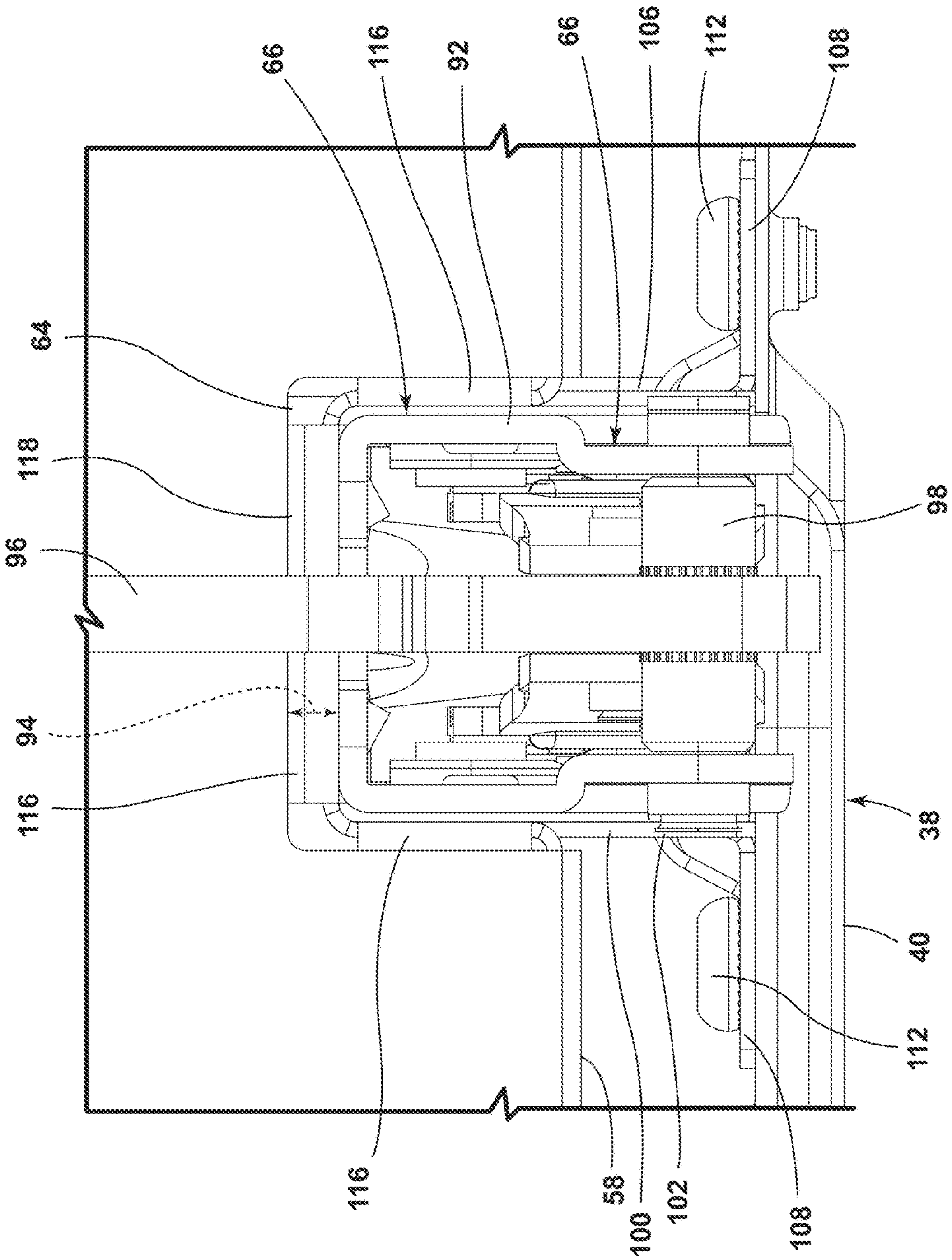
FIG. 9 is a magnified view of area IX of FIG. 3, illustrating the base portion of the latch assembly extending through a latch cutout of a forward panel with a gap separating the latch cutout from the base portion of the latch assembly and sealing flaps of the latch cover partially sealing the gap.

Referring additionally to FIGS. 7-9, the cooking oven 10 further includes a forward panel 58. The forward panel 58 interfaces (e.g., contacts and is attached to) the inner liner assembly 22 and the outer wrapper assembly 38. For example, the side panels 28, 30 and the bottom panel 24 of the inner liner assembly 22 can be coupled to the forward panel 58 and extend rearward 36 from the forward panel 58. Similarly, the forward panel 58 can be coupled to the side panels 44, 46 of the outer wrapper assembly 38 and extend laterally inward therefrom.

The forward panel 58 includes a cavity aperture 60 (see FIG. 3). The cavity aperture 60 defines an opening 62 into the cooking cavity 12. The food item 14 that is inserted into the cooking cavity 12 is placed through the cavity aperture 60 into the cooking cavity 12.

The forward panel 58 further includes a latch cutout 64 (see, e.g., FIG. 9). The latch cutout 64 is disposed elevationally above the bottom panel 40 of the outer wrapper assembly 38. “Cutout” for purposes of this disclosure includes a slot, aperture, or any other change in contour of the forward panel 58 to accommodate a latch assembly 66 of the cooking oven 10 (which will be further discussed below). The forward panel 58 may be fabricated of sheet metal, although other materials are envisioned.

The cooking oven 10 further includes a magnetron 68 (see, e.g., FIG. 7). The magnetron 68 is disposed between the inner liner assembly 22 and the outer wrapper assembly 38. For example, as in the illustrated embodiments, the magnetron 68 is disposed (or at least partially disposed) between the top panel 42 of the outer wrapper assembly 38 and the top panel 26 of the inner liner assembly 22. The magnetron 68 is disposed rearward 36 of the forward panel 58. However, the magnetron 68 can be disposed elsewhere within the outer wrapper assembly 38. The magnetron 68 is configured to generate the electromagnetic waves 16 that increase the temperature of the food item 14 during a microwave cooking operation. For example, the magnetron 68 can include an anode 70, a cathode (not separately illustrated), a magnet (not separately illustrated), among other components, that generate the electromagnetic waves 16. A waveguide 72 guides the electromagnetic waves 16, which are typically high frequency (e.g., 2.45 GHZ), from the magnetron 68 and into the cooking cavity 12 to cook the food item 14.

The cooking oven 10 further includes a door 74 (see FIGS. 1, 2, and 4). The door 74 is disposed forward 34 of the inner liner assembly 22, the outer wrapper assembly 38, and the forward panel 58. The door 74 is movable to, from, and between a closed position 76 (see FIGS. 1 and 2) and an open position 78 (see FIG. 4). In the closed position 76, the door 74 at least partially covers the opening 62 into the cooking cavity 12. In the closed position 76, the door 74 denies access to the cooking cavity 12 from an external environment 80, which may be a kitchen among other places. In the open position 78, the door 74 covers the opening 62 less than when in the closed position 76 (e.g., does not cover the opening 62 at all), and allows access into the cooking cavity 12 from the external environment 80. A user of the cooking oven 10 moves the door 74 to the open position 78 to insert the food item 14 into the cooking cavity 12 and moves the door 74 to the closed position 76. The cooking oven 10 performs the cooking operation that the user desires, such as the user commanded at a human-machine interface 82 of the cooking oven 10. The user then moves the door 74 to the open position 78, removes the food item 14, and moves the door 74 back to the closed position 76. The door 74 has a bottom edge 84.

In embodiments, the door 74 includes a glass pane 86. The glass pane 86 is disposed vertically when the door 74 is in the closed position 76. The glass pane 86 permits the user to see the food item 14 within the cooking cavity 12 while the cooking oven 10 is performing the cooking operation.

In embodiments, the door 74 further includes metal trim 88 attached to the glass pane 86. The metal trim 88 is disposed forward 34 of the latch cutout 64 of the forward panel 58. The metal trim 88 partially defines a forward surface 90 of the door 74 that faces the external environment 80 when the door 74 is in the closed position 76. The glass pane 86 also defines the forward surface 90 of the door 74.

Figure 10:
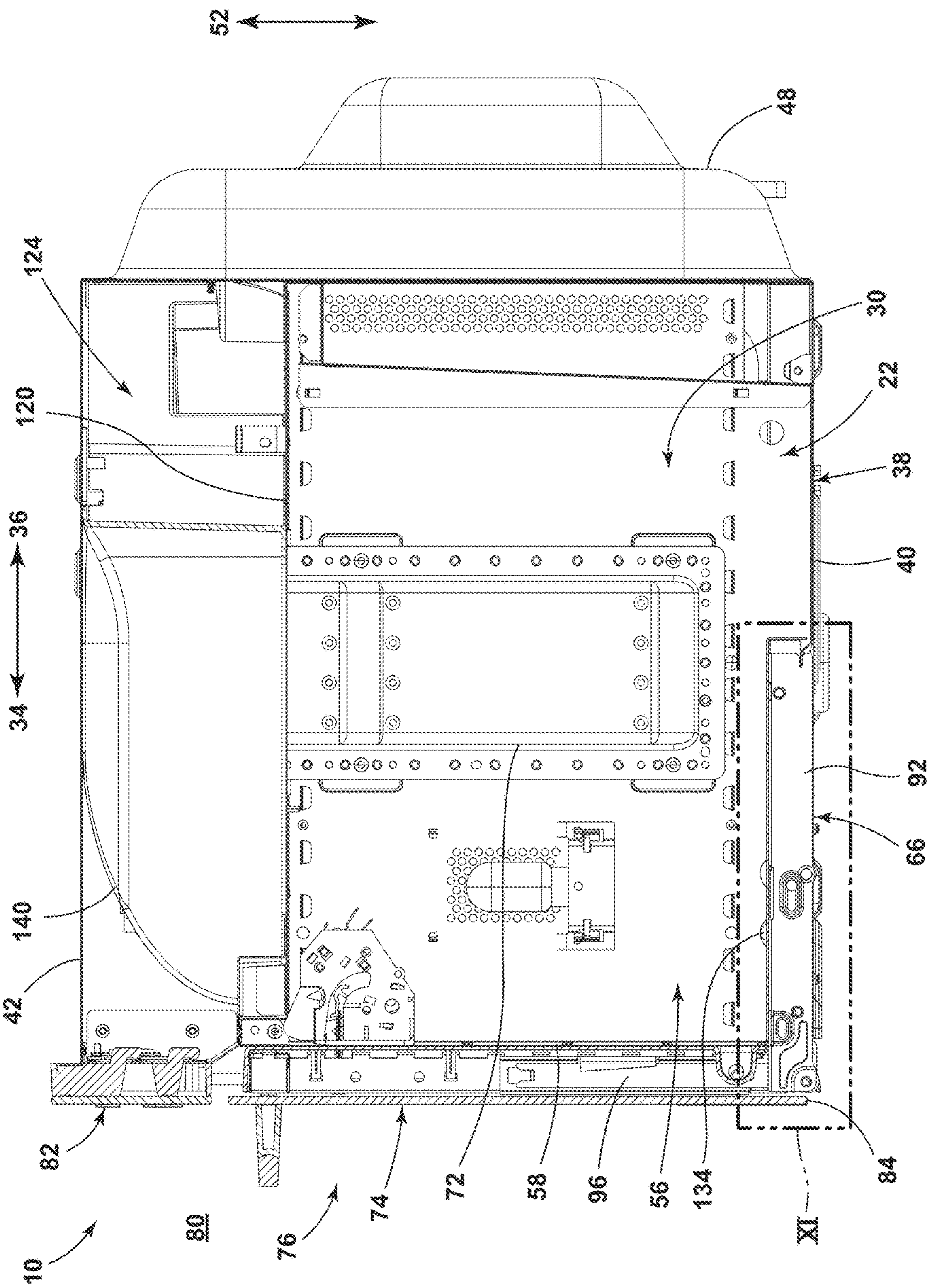
FIG. 10 is a side elevational view of a cross-section of the cooking oven of FIG. 1 taken through line X-X of FIG. 3, illustrating the base portion of the latch assembly disposed on the bottom panel of the outer wrapper assembly with the base portion extending through the latch cutout and a door portion of the latch assembly coupled to the door forward of the forward panel.
Figure 11:
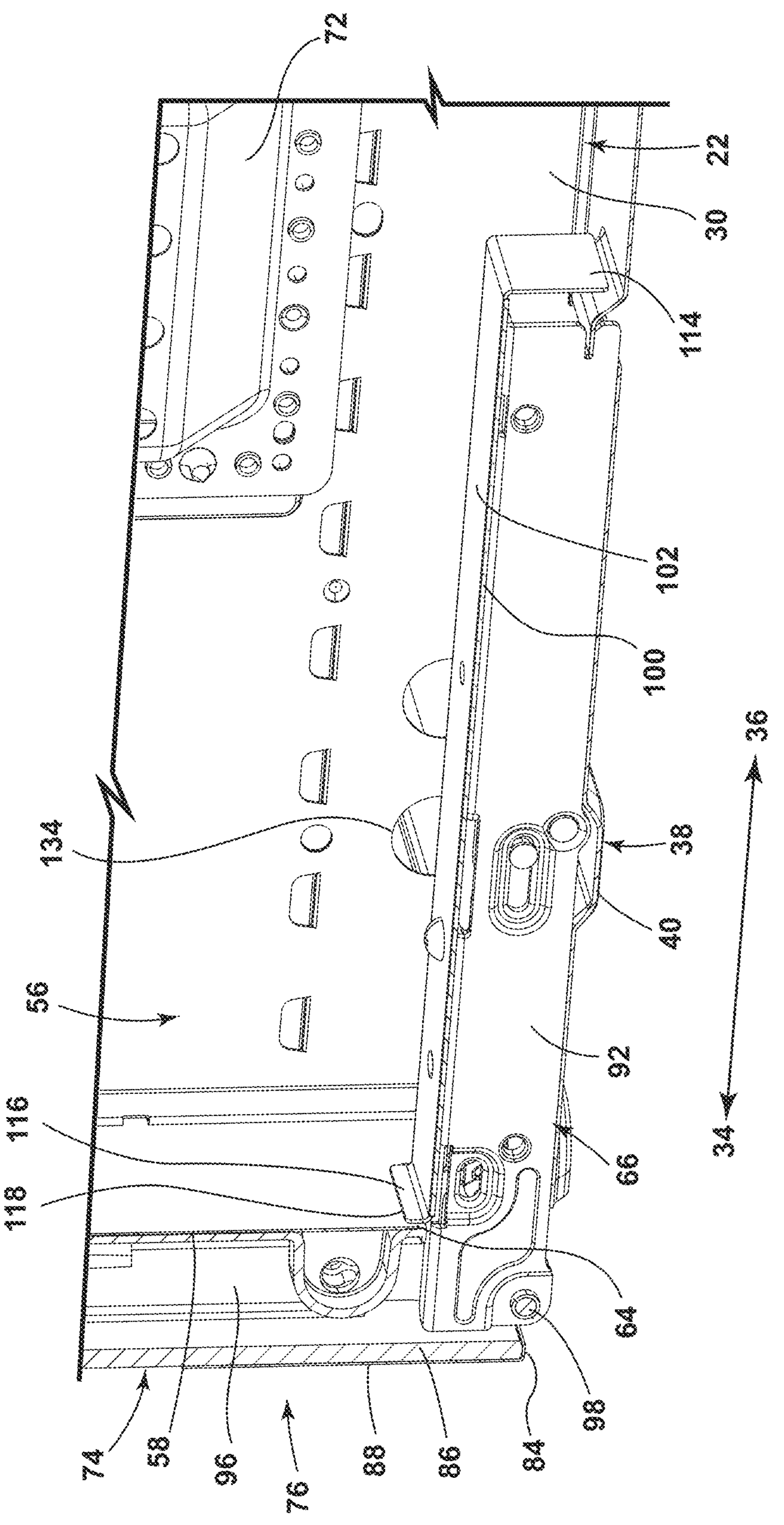
FIG. 11 is a rear overhead magnified perspective view of area XI of FIG. 10, illustrating one of the sealing flaps of the latch cover interacting with the forward panel to partially seal the gap and an air flow aperture through the side panel of the inner liner assembly that leads to a bottom space below the oven cavity.

Referring additionally to FIGS. 10 and 11, as previously mentioned, the cooking oven 10 further includes the latch assembly 66. The latch assembly 66 includes a base portion 92. The base portion 92 is disposed outside of the inner liner assembly 22 (e.g., is not within the cooking cavity 12). For example, the base portion 92 is disposed between the side panel 30 of the inner liner assembly 22 and the side panel 46 of the outer wrapper assembly 38. The base portion 92 is disposed on the bottom panel 40 of the outer wrapper assembly 38. The base portion 92 can be coupled to the bottom panel 40. The base portion 92 additionally extends from rearward 36 of the forward panel 58 through the latch cutout 64 of the forward panel 58 to extend forward 34 of the forward panel 58. A gap 94 separates the base portion 92 from the forward panel 58 at the latch cutout 64.

The latch assembly 66 further includes a door portion 96. The door portion 96 is coupled to the door 74. The door portion 96 is additionally coupled to the base portion 92, such as through a pivot pin 98 that is coupled to both the base portion 92 and the door portion 96. The door portion 96 rotates about or with the pivot pin 98 as the door 74 moves to, from, and between the closed position 76 and the open position 78. The door portion 96 is disposed forward 34 of the forward panel 58. The door portion 96 faces the forward panel 58 and the latch cutout 64 of the forward panel 58 when the door 74 is in the closed position 76.

Figure 12:
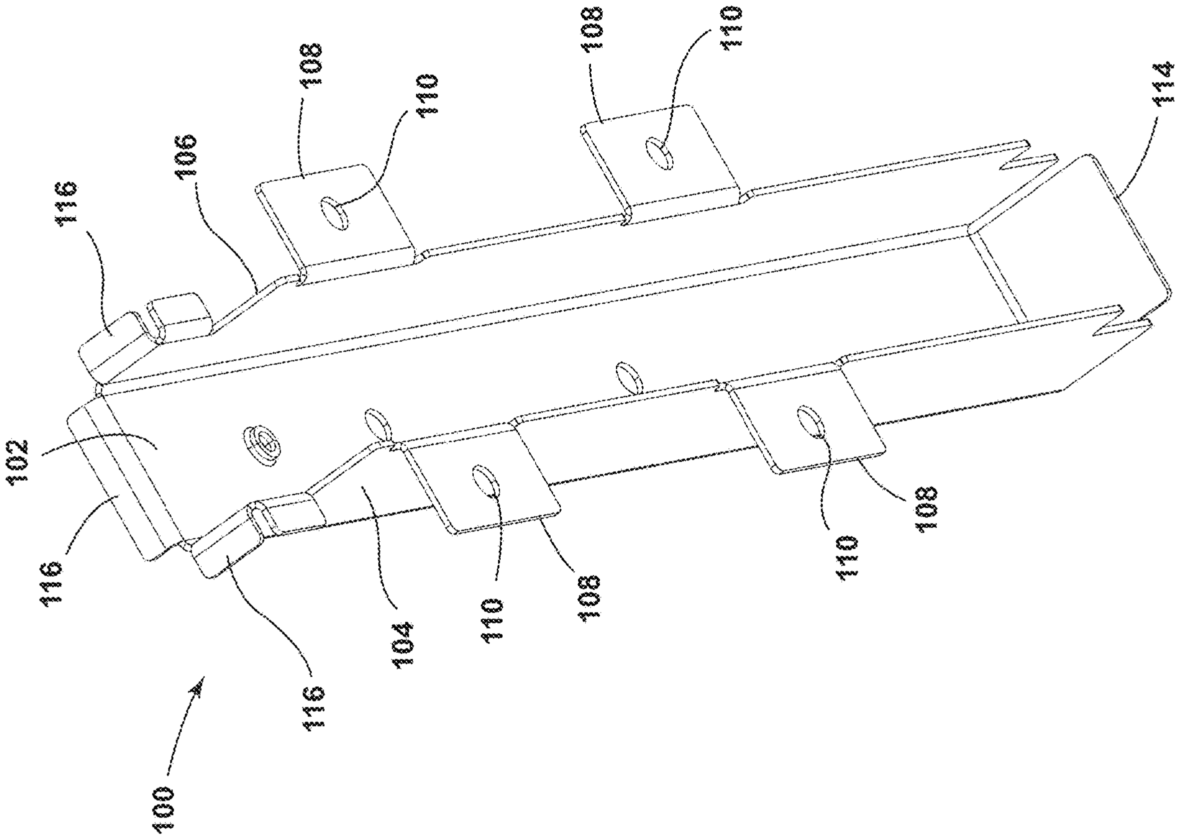
FIG. 12 is a bottom front perspective view of the latch cover, illustrating a top wall, side walls extending downward from the top wall, and attachment wings extending laterally outward from the side walls.

Referring additionally to FIG. 12, the cooking oven 10 further includes a latch cover 100. The latch cover 100 is disposed in the side space 56 between the side panel 30 of the inner liner assembly 22 and the side panel 46 of the outer wrapper assembly 38 where the latch assembly 66 is disposed. The latch cover 100 covers the base portion 92 of the latch assembly 66 disposed rearward 36 of the forward panel 58. In embodiments, the latch cover 100 cooperates with the bottom panel 40 of the outer wrapper assembly 38 to secure the base portion 92 of the latch assembly 66 upon the bottom panel 40 of the outer wrapper assembly 38. For example, the latch cover 100 can include a top wall 102, opposing side walls 104, 106, and attachment wings 108. The top wall 102 is disposed over the base portion 92 of the latch assembly 66. The top wall 102 is horizontally oriented. The opposing side walls 104, 106 extend downward vertically from the top wall 102. The base portion 92 of the latch assembly 66 is disposed between the opposing side walls 104, 106. The attachment wings 108 extend horizontally away from the opposing side walls 104, 106. The attachment wings 108 are disposed upon the bottom panel 40 of the outer wrapper assembly 38. Each of the attachment wings 108 includes an aperture 110 to receive a fastener 112 therethrough to fasten the latch cover 100 to the bottom panel 40. The base portion 92 of the latch assembly 66 is sandwiched between the top wall 102 of the latch cover 100 and the bottom panel 40 of the outer wrapper assembly 38. The latch cover 100 further includes a rear wall 114. The rear wall 114 extends downward from the top wall 102 and is disposed rearward 36 of the base portion 92 of the latch assembly 66. The latch cover 100 can be stamped sheet metal. Other materials for the fabrication of the latch cover 100 are envisioned, such as plastic.

The latch cover 100 further includes one or more sealing flaps 116. The sealing flaps 116 are forwardly disposed. For example, the sealing flaps 116 and the rear wall 114 are disposed on opposite ends of the latch cover 100. The sealing flaps 116 oppose the forward panel 58 at the latch cutout 64 of the forward panel 58. The sealing flaps 116 can extend orthogonally outward from the top wall 102 and the side walls 104, 106. The sealing flaps 116 may contact the forward panel 58. The sealing flaps 116 reduce air flow from the side space 56 through the gap 94 that separates the base portion 92 of the latch assembly 66 from the forward panel 58. The sealing flaps 116 reduce the air flow by at least partially covering the gap 94 (e.g., from the perspective of rearward 36 of the forward panel 58). The latch cover 100 need not entirely cover the gap 94 to reduce air flow through the gap 94 sufficiently to reduce the temperature at the forward surface 90 of the door 74 directly forward 34 of the latch cutout 64. However, in embodiments, the latch cover 100 fully covers the gap 94. The latch cover 100, and particularly the sealing flaps 116, thus functions as a seal 118 that at least partially seals the gap 94 to reduce air flow through the gap 94 from the side space 56 to the door 74.

Figure 13:
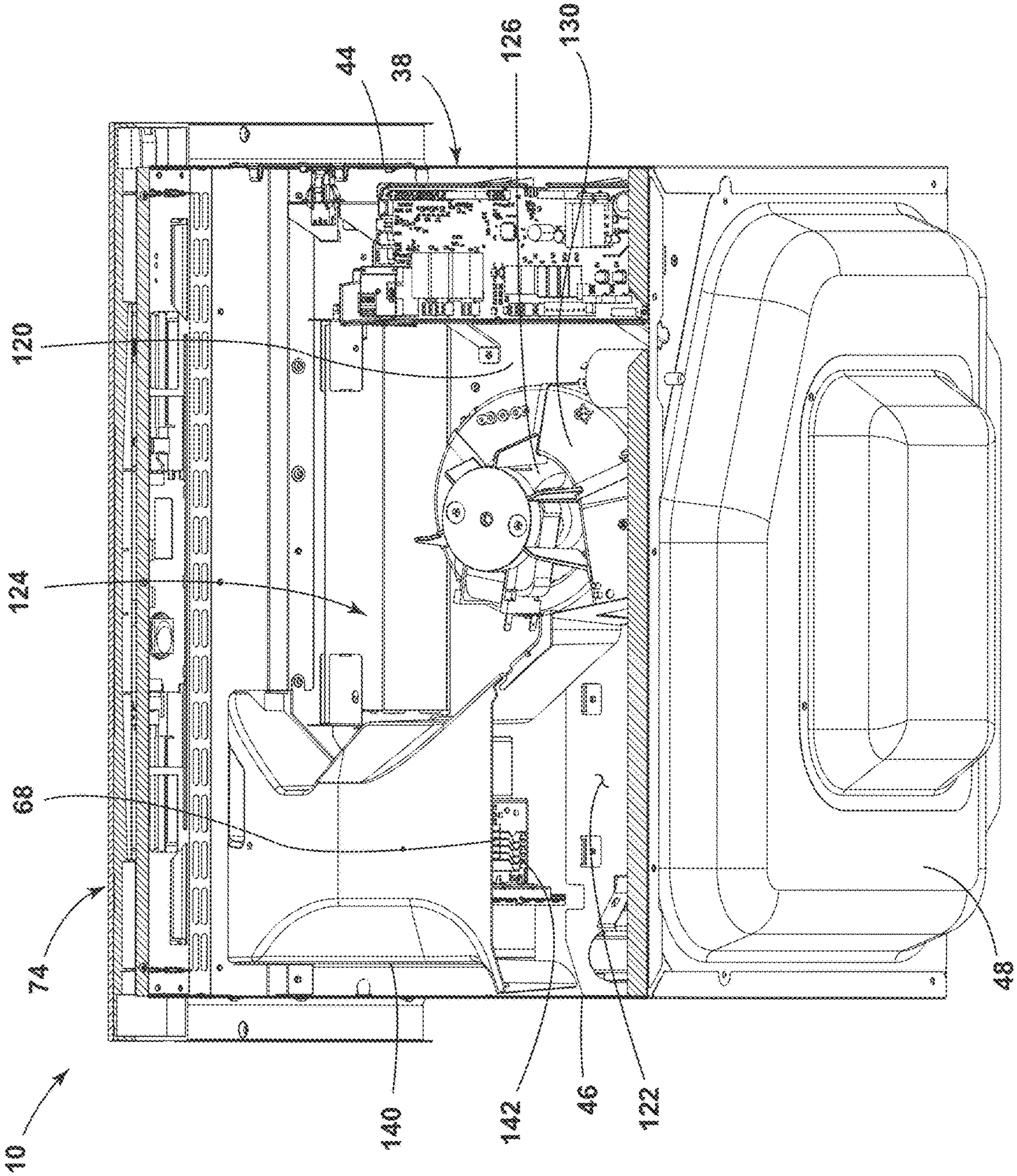
FIG. 13 is a rear overhead perspective view of a cross-section of the cooking oven of FIG. 1 taken through line XIII-XIII of FIG. 3, illustrating a magnetron duct cooperating with a fan duct to direct air to flow within the top space over the magnetron.
Figure 14:
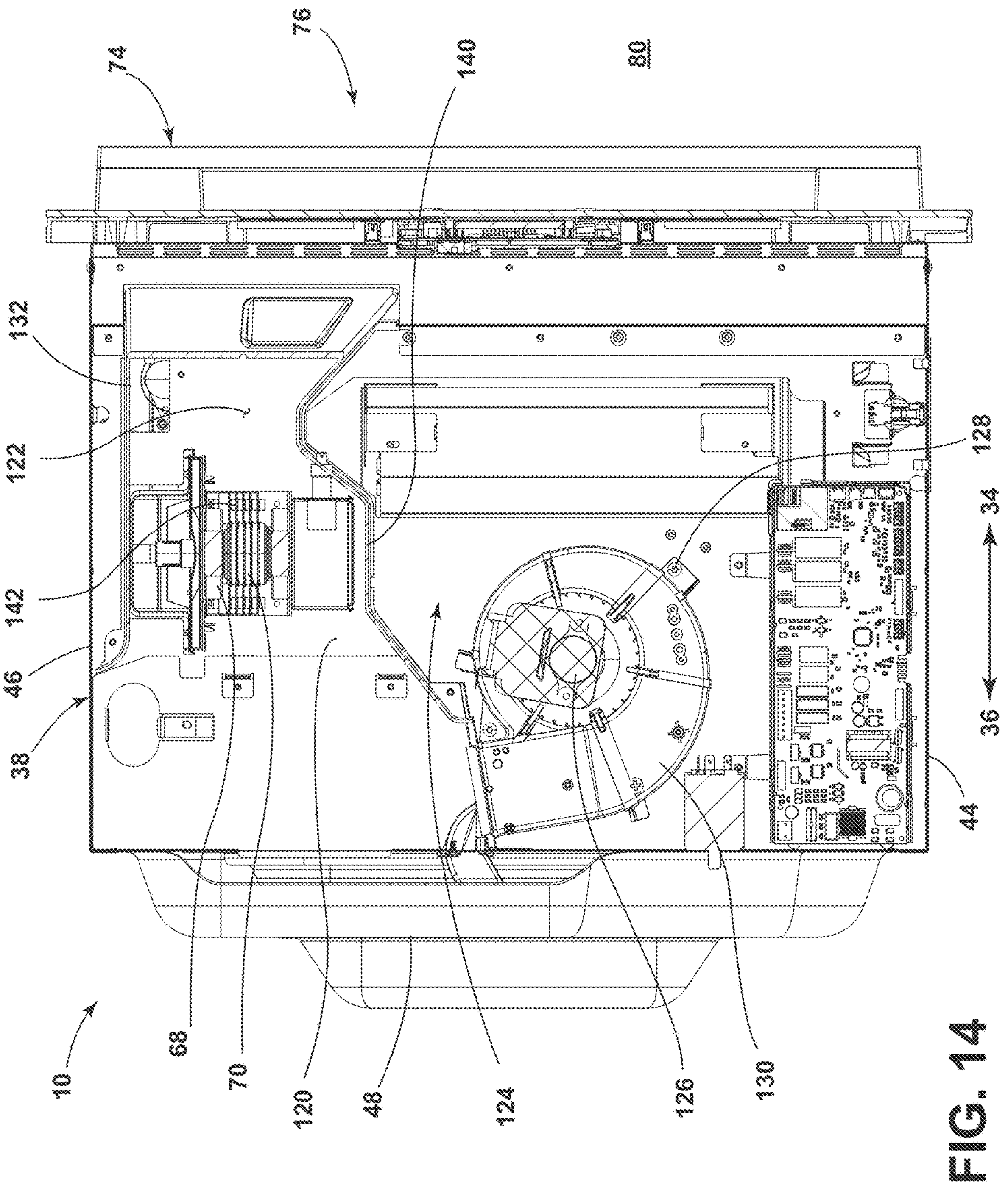
FIG. 14 is a top plan view of a cross-section of the cooking oven of FIG. 1 taken through line XIV-XIV of FIG. 3, illustrating an air flow aperture through the carriage from the top space to the side space.

Referring additionally to FIGS. 13 and 14, in embodiments, the cooking oven 10 further includes a carriage 120. The carriage 120 is disposed between the top panel 26 of the inner liner assembly 22 and the top panel 42 of the outer wrapper assembly 38. The carriage 120 is disposed above the cooking cavity 12. The carriage 120 extends between the side panels 44, 46 of the outer wrapper assembly 38 and can be attached thereto (e.g., via fasteners, not separately illustrated). The carriage 120 can extend between the rear panel 48 of the outer wrapper assembly 38 and the forward panel 58 and can be attached thereto. The carriage 120 provides a top surface 122 that is horizontally oriented. The top surface 122 of the carriage 120 is separated from the top panel 42 of the outer wrapper assembly 38 by a top space 124. The magnetron 68 is at least partially disposed between the carriage 120 and the top panel 42 of the outer wrapper assembly 38 within the top space 124, such as the anode 70 thereof. The magnetron 68 can sit upon the top surface 122 of the carriage 120 and be secured to the carriage 120.

The cooking oven 10 further includes a fan 126. The fan 126 is disposed between the top panel 26 of the inner liner assembly 22 and the top panel 42 of the outer wrapper assembly 38. In embodiments that include the carriage 120, the fan 126 is disposed in the top space 124 between the carriage 120 and the top panel 42 of the outer wrapper assembly 38. The fan 126 is secured to the carriage 120, such as through the use of fasteners 128 that attach a fan duct 130 coupled to the fan 126 to the carriage 120.

The carriage 120, if incorporated, includes an air flow aperture 132 therethrough. The air flow aperture 132 is open to (and thus in communication with) the top space 124 and the side space 56. Further, the side panel 30 of the inner liner assembly 22 closest to the latch cover 100 includes an air flow aperture 134 (see FIG. 11). In embodiments, the air flow aperture 134 opposes the latch cover 100 and the base portion 92 of the latch assembly 66. The air flow aperture 134 is open to, and in communication with, the side space 56 and the bottom space 50. In addition, the bottom panel 40 of the outer wrapper assembly 38 includes an exhaust aperture 136 (see FIG. 6) or forms an exhaust aperture 138 (see FIG. 3) in conjunction with the forward panel 58. The exhaust apertures 136, 138 are open to, and in communication with, the bottom space 50 and the external environment 80.

During operation of the cooking oven 10, the fan 126 causes air to flow from the top space 124, around at least a portion of the magnetron 68 (e.g., the anode 70), through the air flow aperture 132 of the carriage 120, and into the side space 56. The fan 126 further causes the air to flow from the side space 56, through the air flow aperture 134 of the side panel 30 of the inner liner assembly 22, and into the bottom space 50. The fan 126 further causes the air to flow from the bottom space 50 through the exhaust aperture 136 or the exhaust aperture 138 and into the external environment 80.

In embodiments, the cooking oven 10 further includes a magnetron duct 140. The magnetron duct 140 is disposed between the top panel 26 of the inner liner assembly 22 and the top panel 42 of the outer wrapper assembly 38. When the carriage 120 is incorporated, the magnetron duct 140 is disposed within the top space 124 between the top surface 122 of the carriage 120 and the top panel 42 of the outer wrapper assembly 38. The magnetron duct 140 cooperates with the fan duct 130 and the top surface 122 of the carriage 120 to manipulate air flow from the fan 126, within the top space 124 over the magnetron 68 (such as over the anode 70), and then through the air flow aperture 132 of the carriage 120 into the side space 56. The magnetron 68 can further include fins 142. The fins 142 are in thermal communication with the anode 70 of the magnetron 68. The fins 142 improve heat transfer from the magnetron 68 to the air flowing over the magnetron 68 within the top space 124.

The latch cover 100 addresses the problem previously described, because the latch cover 100 reduces the volume of air (now heated by passing over the magnetron 68) that flows from the side space 56 through the gap 94 between the latch cutout 64 of the forward panel 58 and the latch assembly 66 and onto the door 74 forward 34 of the latch assembly 66. The less volume of air that flows through the gap 94, the less volume of air that transfers heat to the door 74 that increases the temperature at the forward surface 90 of the door 74 that is forward 34 of the latch assembly 66 and the latch cutout 64. Instead, the flaps 116 of the latch cover 100 at least partially seal the gap 94 and force the air to flow from the side space 56, through the air flow aperture 134, and into the bottom space 50 and subsequently into the external environment 80 through the exhaust apertures 136, 138. In embodiments, during use of the cooking oven 10, the forward surface 90 of the door 74 at a position 143 directly forward 34 of the latch cutout 64 of the forward panel 58 exhibits a temperature that is at least 7° C. less than a temperature that the forward surface 90 of the door 74 would exhibit without incorporating the latch cover 100.

Figure 15:
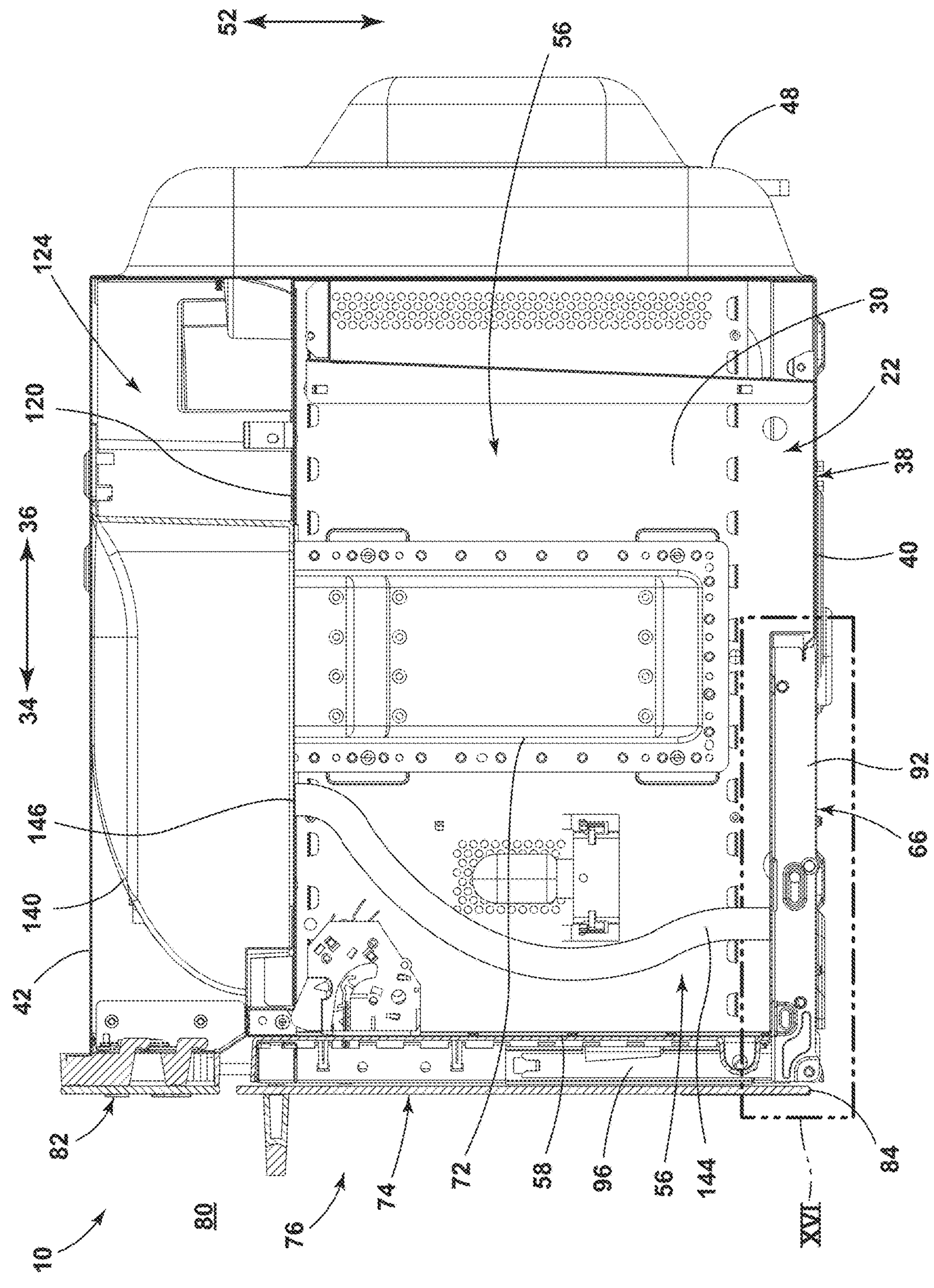
FIG. 15 shows the same view as FIG. 10 but with a variation of the cooking oven that includes an air flow conduit to direct air flow from the top space through the air flow aperture of the carriage and through the air flow conduit of the side panel of the inner liner assembly into the bottom space to bypass the side space.
Figure 16:
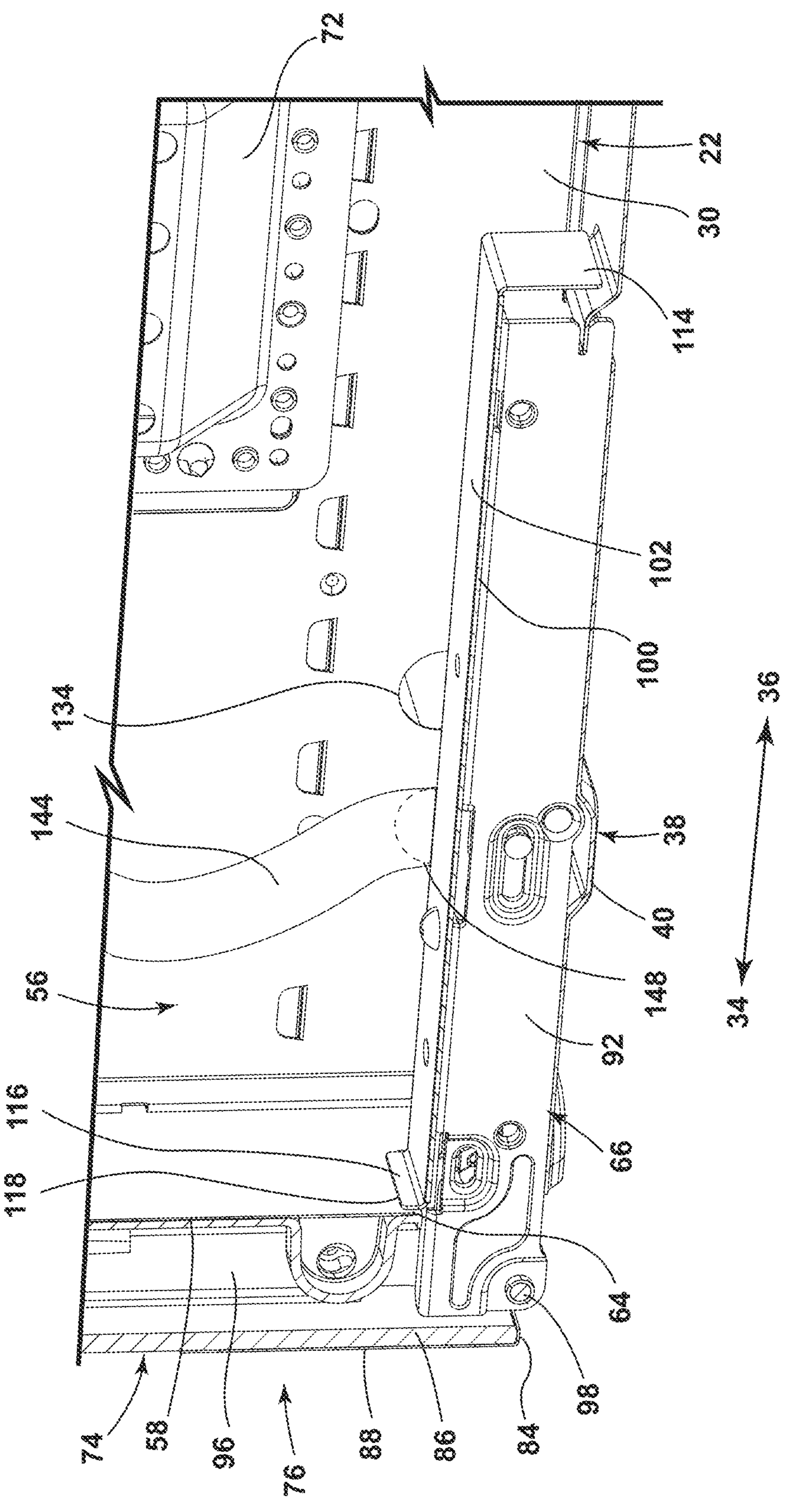
FIG. 16 shows the same view as FIG. 11 but with the variation of the cooking oven that includes the air flow conduit.

Referring now to FIGS. 15 and 16, in a modification, the cooking oven 10 includes an air flow conduit 144. The air flow conduit 144 is disposed within the side space 56 between the side panel 30 of the inner liner assembly 22 and the side panel 46 of the outer wrapper assembly 38. The air flow conduit 144 includes a top end 146 and a bottom end 148. The top end 146 is in communication with the air flow aperture 132 through the carriage 120. The bottom end 148 is in communication with the air flow aperture 132 through the side panel 30 of the inner liner assembly 22. During operation of the cooking oven 10, the fan 126 causes air to flow from the top space 124, over the magnetron 68 (such as the anode 70), through the air flow aperture 132 through the carriage 120, into the air flow conduit 144, through the air flow conduit 144 bypassing the side space 56, through the air flow aperture 132 of the side panel 30 of the inner liner assembly 22, into the bottom space 50, and then through exhaust apertures 136, 138 into the external environment 80. The air flow conduit 144 allowing air, which is heated due to passing over the magnetron 68, to bypass the side space 56 reduces the volume of the air that passes through the gap 94 between the body portion of the latch assembly 66 and the latch cutout 64 of the forward panel 58.

The air flow conduit 144 addresses the problem previously described, because the air flow conduit 144 reduces the volume of air (now heated by passing over the magnetron 68) that flows from the side space 56 through the gap 94 between latch cutout 64 of the forward panel 58 and the latch assembly 66 and onto the door 74 forward 34 of the latch assembly 66. The less volume of air that flows through the gap 94, the less volume of air that transfers heat to the door 74 that increases the temperature of the forward surface 90 of the door 74 forward 34 of the latch assembly 66 and the latch cutout 64. Instead, the air is forced to flow to the bottom space 50 and into the external environment 80 through the exhaust apertures 136, 138. In embodiments, during use of the cooking oven 10, the forward surface 90 of the door 74 at the position 143 directly forward 34 of the latch cutout 64 of the forward panel 58 exhibits a temperature that is at least 7° C. less than a temperature that the forward surface 90 of the door 74 would exhibit without incorporating the air flow conduit 144. In embodiments, the bottom end 148 of the air flow conduit 144 is disposed within 70 mm of the latch cutout 64 of the forward panel 58. Note that the air flow conduit 144 does not direct the air, which was heated from passing over the magnetron 68, into the cooking cavity 12.

EXAMPLES

Figure 17:
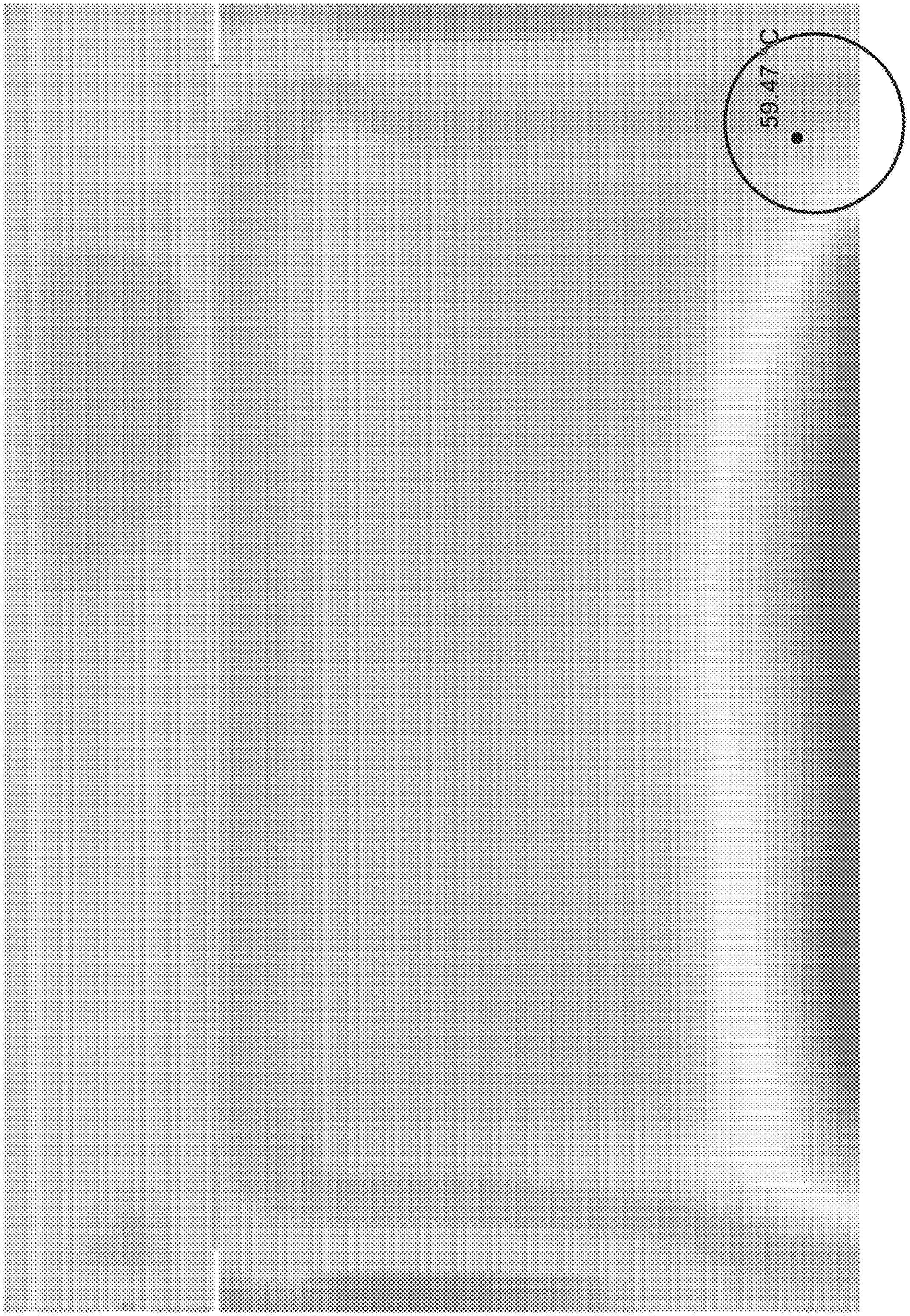
FIG. 17, pertaining to Example 1, is a temperature profile that plots surface temperature as a function of position along the forward surface of the door as determined by a computer model of the cooking oven of the present disclosure that includes the latch cover, revealing that the surface temperature at a position forward of the gap was 59.47° C.

Example 1—Referring to FIG. 17, in Example 1, a computer thermal simulation was conducted to determine the temperature (during use of the cooking oven) as a function of position at the forward surface of the cooking oven of the present disclosure with the latch cover 100. At a position directly forward of the gap 94 and 25 mm above the bottom edge of the door, the temperature of the forward surface of the door was 59.47° C.

Figure 18:
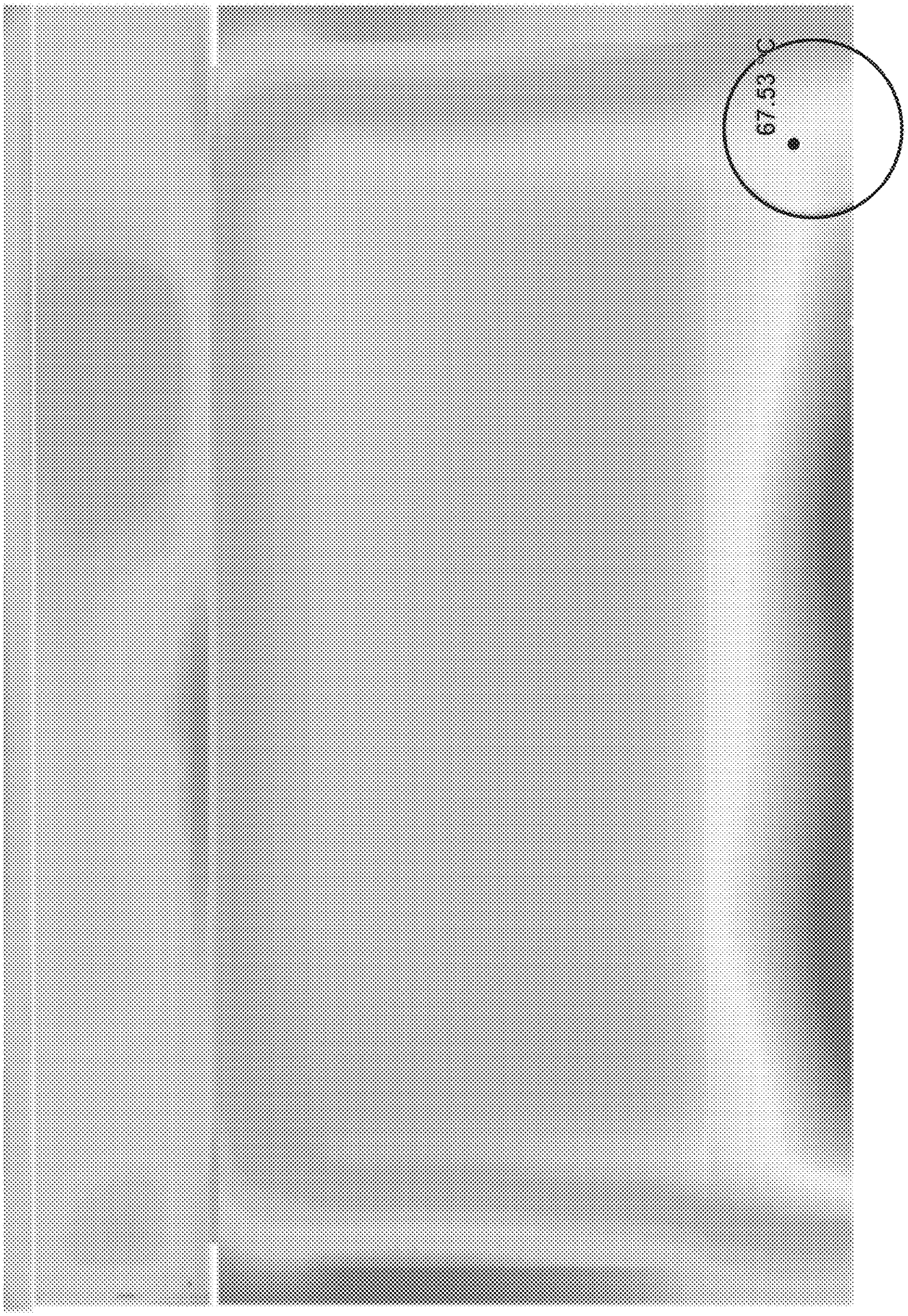
FIG. 18, pertaining to Comparative Example 1, is the same temperature profile as FIG. 17 but of a computer model of a cooking oven akin to the cooking oven modeled at FIG. 17 but without the latch cover, revealing that the surface temperature at the position forward of the gap was 67.53° C., which is considerably higher than Example 1.

Comparative Example 1—Referring to FIG. 18, in Comparative Example 1, the same computer thermal simulation was conducted as Example 1 but without the incorporation of the latch cover 100. At a position directly forward of the gap 94 and 25 mm above the bottom edge of the door, the temperature of the forward surface of the door was 67.53° C., which is an increase of 8.06° C. over Example 1 with the latch cover 100.

The invention disclosed herein is further summarized in the following paragraphs and is further characterized by combinations of any and all of the various aspects described therein.

According to a first aspect of the present disclosure, a cooking oven comprises: (a) an inner liner assembly defining a cooking cavity configured to accept a food item for a cooking operation; (b) an outer wrapper assembly at least partially enveloping the inner liner assembly, the outer wrapper assembly comprising a bottom panel that is disposed beneath the cooking cavity; (c) a forward panel interfacing with the inner liner assembly and the outer wrapper assembly, the forward panel comprising (i) a cavity aperture defining an opening into the cooking cavity and (ii) a latch cutout disposed elevationally above the bottom panel of the outer wrapper assembly; (d) a magnetron disposed between the inner liner assembly and the outer wrapper assembly, and rearward of the forward panel, the magnetron configured to generate electromagnetic waves; (e) a door disposed forward of the inner liner assembly, the outer wrapper assembly, and the forward panel, the door movable to, from, and between (i) a closed position that at least partially covers the opening into the cooking cavity and denies access thereto from an external environment and (ii) an open position that covers the opening into the cooking cavity less than when in the closed position and allows access thereto from the external environment; (f) a latch assembly comprising (i) a base portion that is both disposed outside of the inner liner assembly and disposed on the bottom panel of the outer wrapper assembly and extends through the latch cutout of the forward panel and (ii) a door portion disposed forward of the forward panel that is coupled to both the base portion and the door; and (g) a latch cover that covers the base portion of the latch assembly disposed rearward of the forward panel and at least partially covers a gap between the base portion of the latch assembly and the forward panel at the latch cutout of the forward panel.

According to a second aspect of the present disclosure, the cooking oven of the first aspect is present, wherein the latch cover comprises stamped sheet metal.

According to a third aspect of the present disclosure, the cooking oven of any one of the first through second aspects is presented, wherein the latch cover cooperates with the bottom panel of the outer wrapper assembly to secure the base portion of the latch assembly upon the bottom panel of the outer wrapper assembly.

According to a fourth aspect of the present disclosure, the cooking oven of any one of the first through third aspects is presented, wherein the latch cover comprises (i) a top wall disposed over the base portion of the latch assembly, (ii) opposing side panels extending downward vertically from the top wall with the base portion of the latch assembly disposed between the opposing side panels, (iii) attachment wings extending horizontally away from the opposing side panels and disposed upon the bottom panel of the outer wrapper, the wings receiving fasteners therethrough to fasten the latch cover to the bottom panel with the base portion of the latch assembly sandwiched between the top wall of the latch cover and the bottom panel of the outer wrapper.

According to a fifth aspect of the present disclosure, the cooking oven of any one of the first through fourth aspects are presented, wherein the latch cover comprises one or more sealing flaps that are forwardly disposed and oppose the forward panel at the latch cutout of the forward panel.

According to a sixth aspect of the present disclosure, the cooking oven of any one of the first through fifth aspects is presented, wherein (a) the inner liner assembly comprises (i) a bottom panel that opposes the bottom panel of the outer wrapper is separated therefrom thus forming a bottom space and (ii) side panels that oppose each other and partially define the cooking cavity, (b) the side panels of the inner liner assembly interface with the bottom panel of the outer wrapper assembly and extend upward therefrom, (c) the outer wrapper comprises side panels that oppose each other, with the side panels of the inner liner assembly disposed therebetween, and (d) the latch cover is disposed in a side space between one of the side panels of the outer wrapper assembly and one of the side panels of the inner liner assembly.

According to a seventh aspect of the present disclosure, the cooking oven of the sixth aspect is presented, wherein (i) the side panel of the inner liner assembly disposed closest to the latch cover comprises an air flow aperture laterally opposing the latch cover, and (ii) during operation of the cooking oven, a fan of the cooking oven causes air to flow from the side space, through the air flow aperture of the side panel and into the bottom space.

According to an eighth aspect of the present disclosure, the cooking oven of the seventh aspect is presented, wherein (i) the inner liner assembly comprises a top panel partially defining the cooking cavity, (ii) the outer wrapper assembly comprises a top panel disposed above and opposing the top panel of the inner liner assembly, and (iii) the fan and the magnetron are at least partially disposed between the top panel of the inner liner assembly and the top panel of the outer wrapper assembly.

According to a ninth aspect of the present disclosure, the cooking oven of the eighth aspect further comprises: a carriage attached to the outer wrapper and disposed between the top panel of the inner liner assembly and the top panel of the outer wrapper assembly, the carriage (i) securing the fan, (ii) separated from the top panel of the outer wrapper assembly by a top space, and (iii) comprising an air flow aperture, wherein (i) the magnetron is at least partially disposed within the top space, and (ii) during operation of the cooking oven, the fan causes air to flow from the top space, around at least a portion of the magnetron, through the air flow aperture of the carriage, and into the side space.

According to a tenth aspect of the present disclosure, the cooking aspect of the ninth aspect further comprises: a magnetron duct within the top space cooperating with the carriage and the top panel of the outer wrapper assembly to cause air to flow, during use of the cooking oven, from the fan, over an anode of the magnetron, and through the air flow aperture of the carriage.

According to an eleventh aspect of the present disclosure, the cooking aspect of the tenth aspect is presented, wherein (i) the bottom panel of the outer wrapper assembly comprises an exhaust aperture, or forms an exhaust aperture, that is open at the bottom space and the external environment, and (ii) during operation of the cooking oven, the fan causes air to flow from the bottom space, through the exhaust aperture, and into the external environment.

According to a twelfth aspect of the present disclosure, the cooking oven of any one of the first through eleventh aspects is presented, wherein (a) the door comprises (i) a glass pane that is disposed vertically when the door is in the closed position and (ii) metal trim attached to the glass pane, and (b) the metal trim (i) is disposed forward of the latch cutout of the forward panel and (ii) partially defines a forward surface of the door facing the external environment when the door is in the closed position.

According to a thirteenth aspect of the present disclosure, the cooking oven of any one of the first through twelfth aspects is presented, wherein during use of the cooking oven, the forward surface of the door in the closed position at a position directly forward of the latch cutout of the forward panel exhibits a temperature that is at least 7° C. less than a temperature that the forward surface of the door would exhibit without incorporating the latch cover.

According to a fourteenth aspect of the present disclosure, a cooking oven comprises: (a) an inner liner assembly defining a cooking cavity configured to accept a food item for heating, the inner liner assembly comprising (i) a top panel and (ii) a bottom panel opposing the top panel, and (iii) side panels that oppose each other; (b) an outer wrapper assembly at least partially enveloping the inner liner assembly, the outer wrapper assembly comprising (i) a bottom panel that extends beneath and opposes the bottom panel of the inner liner assembly and is separated therefrom by a bottom space, (ii) a top panel disposed above and opposing the top panel of the inner liner assembly, wherein the side panels of the inner liner assembly interface with the bottom panel of the outer wrapper and extend upward therefrom, and (iii) side panels that oppose each other, with the side panels of the inner liner assembly disposed therebetween and each separated from the nearest side panel of the outer wrapper assembly to form a side space; (c) a carriage attached to the outer wrapper assembly and disposed between top panel of the inner liner assembly and the top panel of the outer wrapper assembly, the carriage (i) separated from the top panel of the outer wrapper assembly by a top space and (ii) comprising an air flow aperture in communication with the top space; (d) a forward panel interfacing with the inner liner and the outer wrapper assembly, the forward panel comprising (i) a cavity aperture defining an opening into the cooking cavity and (ii) a latch cutout disposed elevationally above the bottom panel of the outer wrapper assembly; (e) a magnetron disposed between the carriage and the outer wrapper assembly, and rearward of the forward panel, the magnetron configured to generate electromagnetic waves; (f) a door disposed forward of the inner liner assembly, the outer wrapper assembly, and the forward panel, the door movable to, from, and between (i) a closed position that at least partially covers the opening into the cooking cavity and denies access thereto from an external environment and (ii) an open position that covers the opening into the cooking cavity less than when in the closed position and allows access thereto from the external environment; (g) a latch assembly comprising (a) a base portion that is (i) disposed between one of the side panels of the inner liner assembly and one of the side panels of the outer wrapper assembly and (ii) coupled to the bottom panel of the outer wrapper assembly and extends through the latch cutout of the forward panel, and (b) a door portion disposed forward of the forward panel that is coupled to both the base portion and the door, wherein the side panel of the inner liner assembly closest to the base portion of the latch assembly comprises an air flow aperture in communication with the bottom space; and (h) an air flow conduit disposed within the side space, the air flow conduit comprising (i) a top end in communication with the air flow aperture through the carriage and (ii) a bottom end in communication with the air flow aperture through the side panel of the inner liner assembly.

According to a fifteenth aspect of the present disclosure, the cooking oven of the fourteenth aspect is presented further comprises a fan supported upon the carriage.

According to a sixteenth aspect of the present disclosure, the cooking oven of the fourteenth aspect is presented, wherein during operation of the cooking oven, the fan causes air to flow from the top space, through the air flow aperture through the carriage and into the air flow conduit, through the air flow conduit, through the air flow aperture of the side panel, and into the bottom space.

According to a seventeenth aspect of the present disclosure, the cooking oven of any one of the fifteenth through sixteenth aspects is presented, wherein during operation of the cooking oven, the air flow conduit directs the air to flow from the top space to the bottom space without entering the side space outside of the air flow conduit.

According to an eighteenth aspect of the present disclosure, the cooking oven of any one of the fourteenth through seventeenth aspects is presented, wherein the magnetron is at least partially disposed within the top space.

According to a nineteenth aspect of the present disclosure, the cooking oven of any one of the fourteenth through eighteenth aspects are presented, wherein the bottom end of the air flow conduit is disposed within 70 mm of the latch cutout of the forward panel.

According to a twentieth aspect of the present disclosure, a cooking oven comprises: (a) a cooking cavity; (b) a door to provide selective access to the cooking cavity; (c) a forward panel facing the door when the door takes a closed position, the forward panel comprising a latch cutout; (d) a latch assembly with a base portion that extends from rearward of the forward panel, through the latch cutout with a gap between the latch cutout and the base portion, and forward of the forward panel to couple to the door; and (e) a seal that at least partially seals the gap to reduce air flow through the gap.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking oven comprising:

an inner liner assembly defining a cooking cavity configured to accept a food item for a cooking operation;

an outer wrapper assembly at least partially enveloping the inner liner assembly, the outer wrapper assembly comprising a bottom panel that is disposed beneath the cooking cavity;

a forward panel interfacing with the inner liner assembly and the outer wrapper assembly, the forward panel comprising (i) a cavity aperture defining an opening into the cooking cavity and (ii) a latch cutout disposed elevationally above the bottom panel of the outer wrapper assembly;

a magnetron disposed between the inner liner assembly and the outer wrapper assembly, and rearward of the forward panel, the magnetron configured to generate electromagnetic waves;

a door disposed forward of the inner liner assembly, the outer wrapper assembly, and the forward panel, the door movable to, from, and between (i) a closed position that at least partially covers the opening into the cooking cavity and denies access thereto from an external environment and (ii) an open position that covers the opening into the cooking cavity less than when in the closed position and allows access thereto from the external environment;

a latch assembly comprising (i) a base portion that is both disposed outside of the inner liner assembly and disposed on the bottom panel of the outer wrapper assembly and extends through the latch cutout of the forward panel and (ii) a door portion disposed forward of the forward panel that is coupled to both the base portion and the door; and a latch cover that covers the base portion of the latch assembly disposed rearward of the forward panel and at least partially covers a gap between the base portion of the latch assembly and the forward panel at the latch cutout of the forward panel, wherein the inner liner assembly comprises (i) a bottom panel that opposes the bottom panel of the outer wrapper assembly and is separated therefrom thus forming a bottom space and (ii) side panels that oppose each other and partially define the cooking cavity, the side panels of the inner liner assembly interface with the bottom panel of the outer wrapper assembly and extend upward therefrom, wherein the outer wrapper assembly comprises side panels that oppose each other, with the side panels of the inner liner assembly disposed therebetween, and wherein the latch cover is disposed in a side space between one of the side panels of the outer wrapper assembly and one of the side panels of the inner liner assembly.

2. The cooking oven of claim 1, wherein the latch cover comprises stamped sheet metal.

3. The cooking oven of claim 1, wherein the latch cover cooperates with the bottom panel of the outer wrapper assembly to secure the base portion of the latch assembly upon the bottom panel of the outer wrapper assembly.

4. The cooking oven of claim 1, wherein the latch cover comprises (i) a top wall disposed over the base portion of the latch assembly, (ii) opposing side panels extending downward vertically from the top wall with the base portion of the latch assembly disposed between the opposing side panels, (iii) attachment wings extending horizontally away from the opposing side panels and disposed upon the bottom panel of the outer wrapper assembly, the attachment wings receiving fasteners therethrough to fasten the latch cover to the bottom panel with the base portion of the latch assembly sandwiched between the top wall of the latch cover and the bottom panel of the outer wrapper assembly.

5. The cooking oven of claim 1, wherein the latch cover comprises one or more sealing flaps that are forwardly disposed and oppose the forward panel at the latch cutout of the forward panel.

6. The cooking oven of claim 1, wherein the side panel of the inner liner assembly disposed closest to the latch cover comprises an air flow aperture laterally opposing the latch cover, and during operation of the cooking oven, a fan of the cooking oven causes air to flow from the side space, through the air flow aperture of the side panel and into the bottom space.

7. The cooking oven of claim 6, wherein the inner liner assembly comprises a top panel partially defining the cooking cavity, the outer wrapper assembly comprises a top panel disposed above and opposing the top panel of the inner liner assembly, and the fan and the magnetron are at least partially disposed between the top panel of the inner liner assembly and the top panel of the outer wrapper assembly.

8. The cooking oven of claim 7 further comprising:

a carriage attached to the outer wrapper assembly and disposed between the top panel of the inner liner assembly and the top panel of the outer wrapper assembly, the carriage (i) securing the fan, (ii) separated from the top panel of the outer wrapper assembly by a top space, and (iii) comprising an air flow aperture, wherein, the magnetron is at least partially disposed within the top space, and wherein, during operation of the cooking oven, the fan causes air to flow from the top space, around at least a portion of the magnetron, through the air flow aperture of the carriage, and into the side space.

9. The cooking oven of claim 8 further comprising:

a magnetron duct within the top space cooperating with the carriage and the top panel of the outer wrapper assembly to cause the air to flow, during use of the cooking oven, from the fan, over an anode of the magnetron, and through the air flow aperture of the carriage.

10. The cooking oven of claim 9, wherein the bottom panel of the outer wrapper assembly comprises an exhaust aperture, or forms an exhaust aperture, that is open at the bottom space and the external environment, and during operation of the cooking oven, the fan causes the air to flow from the bottom space, through the exhaust aperture, and into the external environment.

11. The cooking oven of claim 1, wherein the door comprises (i) a glass pane that is disposed vertically when the door is in the closed position and (ii) metal trim attached to the glass pane, and the metal trim (i) is disposed forward of the latch cutout of the forward panel and (ii) partially defines a forward surface of the door facing the external environment when the door is in the closed position.

12. The cooking oven of claim 1, wherein during use of the cooking oven, a forward surface of the door in the closed position at a position directly forward of the latch cutout of the forward panel exhibits a temperature that is at least 7° C. less than a temperature that the forward surface of the door would exhibit without incorporating the latch cover.

13. A cooking oven comprising:

a cooking cavity;

a door to provide selective access to the cooking cavity;

a forward panel facing the door when the door takes a closed position, the forward panel comprising a latch cutout;

a latch assembly with a base portion that extends from rearward of the forward panel, through the latch cutout with a gap between the latch cutout and the base portion, and forward of the forward panel to couple to the door; and a latch cover comprising one or more sealing flaps that are rearward of the forward panel, the sealing flaps opposing the forward panel at the latch cutout and at least partially covering the gap to reduce air flow through the gap.

14. The cooking oven of claim 13, wherein the sealing flaps contact the forward panel.

15. The cooking oven of claim 13, wherein the latch cover comprises (i) a top wall and (ii) side walls extending from the top wall, and wherein the sealing flaps extend orthogonally outward from the top wall and the side walls.

16. The cooking oven of claim 15, wherein the top wall is disposed over the base portion of the latch assembly, and wherein the side walls extend downward vertically from the top wall with the base portion of the latch assembly disposed between the side walls.

17. A cooking oven comprising:

an inner liner assembly defining a cooking cavity configured to accept a food item for a cooking operation;

an outer wrapper assembly at least partially enveloping the inner liner assembly, the outer wrapper assembly comprising a bottom panel that is disposed beneath the cooking cavity;

a forward panel interfacing with the inner liner assembly and the outer wrapper assembly, the forward panel comprising (i) a cavity aperture defining an opening into the cooking cavity and (ii) a latch cutout disposed elevationally above the bottom panel of the outer wrapper assembly;

a magnetron disposed between the inner liner assembly and the outer wrapper assembly, and rearward of the forward panel, the magnetron configured to generate electromagnetic waves;

a door disposed forward of the inner liner assembly, the outer wrapper assembly, and the forward panel, the door movable to, from, and between (i) a closed position that at least partially covers the opening into the cooking cavity and denies access thereto from an external environment and (ii) an open position that covers the opening into the cooking cavity less than when in the closed position and allows access thereto from the external environment;

a latch assembly comprising (i) a base portion that is both disposed outside of the inner liner assembly and disposed on the bottom panel of the outer wrapper assembly and extends through the latch cutout of the forward panel and (ii) a door portion disposed forward of the forward panel that is coupled to both the base portion and the door; and a latch cover that covers the base portion of the latch assembly disposed rearward of the forward panel and at least partially covers a gap between the base portion of the latch assembly and the forward panel at the latch cutout of the forward panel, wherein, during use of the cooking oven, a forward surface of the door in the closed position at a position directly forward of the latch cutout of the forward panel exhibits a temperature that is at least 7° C. less than a temperature that the forward surface of the door would exhibit without incorporating the latch cover.

* * * * *